US009002590B2

(12) United States Patent
Akiyama et al.

(10) Patent No.: US 9,002,590 B2
(45) Date of Patent: Apr. 7, 2015

(54) ENGINE CONTROL DEVICE AND ENGINE CONTROL METHOD

(75) Inventors: Teruo Akiyama, Kokubunji (JP); Hisashi Asada, Yokohama (JP); Takeshi Ooi, Oiso-machi (JP)

(73) Assignee: Komatsu, Ltd., Tokyo (JP)

( * ) Notice: Subject to any disclaimer, the term of this patent is extended or adjusted under 35 U.S.C. 154(b) by 628 days.

(21) Appl. No.: 12/867,577

(22) PCT Filed: Feb. 18, 2009

(86) PCT No.: PCT/JP2009/052773
§ 371 (c)(1), (2), (4) Date: Aug. 13, 2010

(87) PCT Pub. No.: WO2009/104636
PCT Pub. Date: Aug. 27, 2009

(65) Prior Publication Data
US 2010/0332102 A1 Dec. 30, 2010

(30) Foreign Application Priority Data
Feb. 18, 2008 (JP) ................................ 2008-035765

(51) Int. Cl.
*G06F 7/70* (2006.01)
(Continued)

(52) U.S. Cl.
CPC ............. *E02F 9/2246* (2013.01); *E02F 9/2232* (2013.01); *E02F 9/2285* (2013.01); *F02D 29/04* (2013.01)

(58) Field of Classification Search
USPC ........ 701/50, 54, 84, 110–112; 477/107, 121; 123/319, 325, 329
See application file for complete search history.

(56) References Cited

U.S. PATENT DOCUMENTS 4,637,781 A 1/1987 Akiyama et al.
6,020,651 A 2/2000 Nakamura et al.
2009/0320461 A1* 12/2009 Morinaga et al. ............... 60/431

FOREIGN PATENT DOCUMENTS

CN 85104096 A 5/1986
CN 1208814 A 2/1999
JP 10-273919 A 10/1998
(Continued)

OTHER PUBLICATIONS

International Search Report dated Mar. 17, 2009 issued in International Appln. No. PCT/JP2009/052773.
Chinese Office Action dated Dec. 3, 2014, issued in counterpart Chinese Application No. 201210494604.7.

*Primary Examiner* — Jeffrey Shapiro
(74) *Attorney, Agent, or Firm* — Holtz, Holtz, Goodman & Chick PC

(57) ABSTRACT

A first target engine speed N1 and a high-speed control area F1 are set according to a command value commanded by a command unit. A second target engine speed N2 and a high-speed control area F2 defined on a low-speed side are set according to the first target engine speed N1. A pump displacement D and an engine torque T of a variable displacement hydraulic pump are detected so that a target engine speed N corresponding to each of the detected pump displacement and engine torque is detected according to a preset relationship between a the pump displacement D and the target engine speed N and a preset relationship between the engine torque T and the target engine speed N during an engine control at the high-speed control area F2. The drive of the engine is controlled so that the engine is driven at the target engine speed N.

6 Claims, 16 Drawing Sheets

(51) Int. Cl.

| | |
|---|---|
| ***G06F 19/00*** | (2011.01) |
| ***G06G 7/00*** | (2006.01) |
| ***G06G 7/76*** | (2006.01) |
| ***E02F 9/22*** | (2006.01) |
| ***F02D 29/04*** | (2006.01) |

(56) References Cited

FOREIGN PATENT DOCUMENTS

| | | | |
|---|---|---|---|
| JP | 2001-323827 | A | 11/2001 |
| JP | 2007-218111 | A | 8/2007 |

* cited by examiner

ENGINE CONTROL DEVICE AND ENGINE CONTROL METHOD

This application is a U.S. National Phase Application under 35 USC 371 of International Application PCT/JP2009/052773 filed Feb. 18, 2009.

TECHNICAL FIELD

The invention relates to an engine control device and an engine control method that control the drive of an engine based on a predetermined target engine speed. In particular, the invention relates to an engine control device and an engine control method that contribute to improvement in the fuel consumption of an engine.

BACKGROUND ART

In a work vehicle, when an engine load is equal to or lower than a rated engine torque, the engine torque is matched to the engine load in a high-speed control area in a torque chart. For instance, a target engine speed is set according to the setting of a fuel dial and the high-speed control area associated with this target engine speed is set.

Alternatively, the high-speed control area is set according to the setting of a fuel dial and the target engine speed associated with this high-speed control area is set. The engine load and the engine torque are matched in this high-speed control area.

Many operators generally set a target engine speed at or around a rated engine speed so as to improve an operating quantity. A low fuel-consumption area, namely a fuel-efficient area, usually exists in a middle-speed area or a high-torque area on an engine torque chart. Therefore, a high-speed control area defined between a non-load high-idle speed and a rated speed does not correspond to an efficient area in terms of fuel consumption.

In order to drive an engine in the fuel-efficient area, a typically-known control device presets the value of a target engine speed and the value of a target engine output torque, which values correspond to each other, for each of plural selectable operation modes (see, for instance, Patent Document 1). With the use of such a control device, when an operator selects, for instance, a second operation mode, the engine speed can be set lower than that in a first operation mode, and therefore the fuel consumption can be improved.

However, according to the above-described operation mode switching, the operator needs to operate the operation mode switching each time to improve the fuel consumption. Further, in a situation where the engine speed in the second operation mode is set at a value simply reduced relative to the engine speed in the first operation mode, selection of the second operation mode leads to the following problem. The maximum speed of a working device (hereinafter referred to as a work equipment) of a work vehicle is decreased as compared to that in the first operation mode. As a result, an operating quantity in the second operation mode becomes smaller than that in the first operation mode.

[Patent Document 1] JP-A-10-273919

DISCLOSURE OF THE INVENTION

Problems to be Solved by the Invention

An object of the invention is to solve the problem inherent in the related art. The invention provides an engine control device and an engine control method that are capable of controlling the drive of an engine in a situation of a low engine speed based on a second target engine speed, the second target engine speed defined on a low-speed side relative to a selected first target engine speed, and controlling the drive of an engine in use of the engine at a high torque so that the engine is driven at a preset target engine speed, the target engine speed corresponding to the pump displacement of a variable displacement hydraulic pump or the detected engine torque.

Especially, the invention provides an engine control device and an engine control method that: improve the fuel consumption of an engine; excellently smoothly change an engine speed while maintaining a pump discharge amount required by a work equipment; and prevent an uncomfortable feeling resulting from a discontinuous change in engine noise.

Means for Solving the Problems

The object of the invention can be attained by inventions, described hereinbelow directed to an engine control device and inventions, described hereinbelow directed to an engine control method.

An engine control device according to an aspect of the invention, includes: a variable displacement hydraulic pump driven by an engine; a hydraulic actuator driven by a discharge pressure oil from the hydraulic pump; a control valve that controls the discharge pressure oil from the hydraulic pump so that the discharge pressure oil is supplied to the hydraulic actuator; a detector that detects a pump displacement of the hydraulic pump and an engine torque; a fuel injection device that controls a fuel supplied to the engine; a command unit that selects and commands one of variable command values; a first setting unit that sets a first target engine speed according to the command value commanded by the command unit and a second target engine speed based on the first target engine speed, the second target engine speed being lower than the first target engine speed; and a second setting unit that sets a relationship between the pump displacement detected by the detector and a target engine speed and a relationship between the engine torque detected by the detector and the target engine speed, in which when the drive control of the engine is initiated based on the second target engine speed, the fuel injection device is controlled so that the engine is controllably driven at the target engine speed set by the second setting unit corresponding to the pump displacement or the engine torque detected by the detector.

In the above aspect of the invention, while the engine is controlled based on the second target engine speed, the fuel is preferably controlled by the fuel injection device based on the target engine speed set by the second setting unit after the pump displacement of the hydraulic pump exceeds a preset second predetermined pump displacement or after the engine torque exceeds a preset second predetermined engine torque.

Further, in the above aspect of the invention, while the engine is controlled based on the first target engine speed, the fuel is preferably controlled by the fuel injection device based on the target engine speed set by the second setting unit after the pump displacement of the hydraulic pump falls below a preset first predetermined pump displacement or after the engine torque falls below a preset first predetermined engine torque.

Still further, in the above aspect of the invention, the target engine speed set by the second setting unit is preferably higher one of the target engine speed corresponding to the pump displacement detected by the detector and the target engine speed corresponding to the engine torque detected by the detector.

An engine control method according to another aspect of the invention is for an engine including: a variable displacement hydraulic pump driven by an engine; hydraulic actuator driven by a discharge pressure oil from the hydraulic pump; a control valve that controls the discharge pressure oil from the hydraulic pump so that the discharge pressure oil is supplied to the hydraulic actuator; and a detector that detects a pump displacement and an engine torque of the hydraulic pump. The engine control method includes: selecting one of variable command values so that a first target engine speed is set according to the selected variable command value; setting a second target engine speed based on the first target engine speed, the second target engine speed being lower than the first target engine speed; presetting target engine speeds corresponding to the detected pump displacement and the detected engine torque; and initiating the drive of the engine based on the second target engine speed and controlling the drive of the engine based on one of the preset target engine speeds corresponding to either one of the pump displacement and the engine torque detected by the detector.

In the above aspect of the invention, while the engine is controlled based on the second target engine speed, the drive of the engine is preferably controlled based on the target engine speed after the pump displacement of the hydraulic pump exceeds a preset second predetermined pump displacement or after the engine torque exceeds a preset second predetermined engine torque.

Further, in the above aspect of the invention, while the engine is controlled based on the first target speed, the drive of the engine is preferably controlled based on the target engine speed after the pump displacement of the hydraulic pump falls below a preset first predetermined pump displacement or after the engine torque falls below a preset first predetermined engine torque.

Still further, in the above aspect of the invention, the drive of the engine is preferably controlled based on the target engine speed corresponding to the pump displacement detected by the detector.

Still further, in the above aspect of the invention, the drive of the engine is preferably controlled based on the target engine speed corresponding to the engine torque detected by the detector.

Still further, in the above aspect of the invention, the drive of the engine is preferably controlled based on higher one of the preset target engine speed corresponding to the pump displacement detected by the detector, and the preset target engine speed corresponding to the engine torque detected by the detector.

Effect of the Invention

According to an engine control device and an engine control method of the aspects of the invention, it is possible to set a first target engine speed according to a command value commanded by a command unit and set a second target engine speed on a low-speed side based on the first target engine speed. In order to control the drive of an engine at a relatively low engine torque, the drive control of the engine can be initiated based on the second target engine speed. In this manner, shifting to a fuel-efficient area is possible without substantially changing the operation performance of a work vehicle, and therefore the engine can be driven with a reduced fuel consumption.

Further, it is possible to obtain a target engine speed corresponding to a detected pump displacement or a detected engine torque and to control the drive of the engine so that the engine is driven at the obtained target engine speed.

With above arrangement, it is possible to excellently smoothly change the engine speed while maintaining a required pump discharge amount and matching an engine load and the engine torque. Since a discontinuous change in engine noise is prevented, an uncomfortable feeling resulting therefrom is prevented. Since the engine speed is excellently smoothly changed, fuel consumption is significantly improved.

According to the invention, in a situation where the drive of the engine is controlled at the second target engine speed, the drive control of the engine at the second target engine speed continues until the pump displacement of the variable displacement hydraulic pump becomes equal to or greater than a preset second predetermined pump displacement or until the engine torque becomes equal to or greater than a preset second predetermined engine torque. After the pump displacement or the engine torque becomes equal to or greater than the second predetermined pump displacement or the second predetermined engine torque, the drive of the engine is controlled so that the engine is driven at the target engine speed corresponding to the detected pump displacement or the detected engine torque.

In this manner, the engine can be rotated in a suitable condition to the operational situation of a work equipment desired by an operator and the variable displacement hydraulic pump can consume the maximum output of the engine to discharge a pressure oil therefrom. The same operation performance can thus be exhibited as ever for an operation that requires the maximum output of the engine in a heavy-excavation work or the like.

According to the invention, when the drive of the engine is controlled at the first target engine speed, the drive control of the engine at the first target engine speed continues until the pump displacement of the variable displacement hydraulic pump falls to or below a preset first predetermined pump displacement or until the engine torque falls to or below a preset first predetermined engine torque. After the pump displacement or the engine torque becomes equal to or smaller than the first predetermined pump displacement or the first predetermined engine torque, the drive of the engine is controlled so that the engine is driven at the target engine speed corresponding to the detected pump displacement or the detected engine torque.

In this manner, when the drive of the engine is controlled at the first target engine speed, a high engine torque is maintained until the pump displacement of the variable displacement hydraulic pump falls to or below the first predetermined pump displacement or until the engine torque falls to or below the first predetermined engine torque. When the variable displacement hydraulic pump does not require a high engine torque after the pump displacement of the variable displacement hydraulic pump falls to or below the first predetermined pump displacement or after the engine torque falls to or below the first predetermined engine torque, the drive of the engine is controlled at the target engine speed, corresponding to the detected pump displacement or the detected engine torque, being lower than the first predetermined target engine speed. The above-described drive control of the engine leads to reduction in the fuel consumption of the engine.

Further, according to the invention, higher one of the target engine speed corresponding to the detected pump displacement and the target engine speed corresponding to the detected engine torque is employed as the target engine speed for controlling the drive of the engine.

With this arrangement, the maximum rated horsepower point of the engine is passed through on the torque chart and the drive of the engine is smoothly and efficiently controlled maintaining a pump discharge amount required by the hydraulic actuator.

According to the invention, the drive of the engine can be controlled based on a fuel-efficient target engine speed so that the required pump discharge amount is maintained while the fuel consumption of the engine is reduced. Further, the above arrangement, whose arrangement is rather simple, allows the variable displacement hydraulic pump to consume the maximum output of the engine and allows the fuel consumption of the engine to be reduced.

Incidentally, the detected pump displacement is obtained from the detected value of the swash-plate angle of the hydraulic pump or from an equation representing the pump displacement. The equation representing the pump displacement is, for instance, $D=200\pi\cdot T/P$, which is derived by an equation $T=P\cdot D/200\pi$ representing a relationship between the discharge pressure P of the variable displacement hydraulic pump, the discharge capacity D (pump displacement D) and the engine torque T. With the equation $D=200\pi\cdot T/P$, the ongoing pump displacement of the hydraulic pump is obtained.

Alternatively, the pump displacement can be obtained according to, for instance, a relationship of a differential pressure between the pump discharge pressure of the variable displacement hydraulic pump and the load pressure of the hydraulic actuator relative to a differential pressure set in a pump control device that controls the swash-plate angle of the variable displacement hydraulic pump (usually called as a load sensing differential pressure).

Further, the engine torque may be obtained in an appropriate manner such as using a typically-known engine torque detector or the like, or calculating from the pump displacement and the pump discharge pressure.

According to the invention, high-speed control areas are defined in a T-N chart of an engine (i.e. a torque chart with an engine torque axis and an engine speed axis). The high-speed control areas are respectively associated with the first target engine speed, the second target engine speed and the target engine speed corresponding to the detected pump displacement or the detected engine torque between the first target engine speed and the second target engine speed.

The drive of the engine is controlled based on the target engine speed corresponding to the detected pump displacement. The following target engine speeds are set one after another according to the current pump capacities of the variable displacement hydraulic pump.

The target engine speeds are in this manner set one after another, whereby the pump displacement of the variable displacement hydraulic pump is controlled to be optimal. Even when the pump displacement of the hydraulic pump changes, the target engine speed can be changed in response to the change of the pump displacement, whereby a discharge flow required by the hydraulic actuator can be ensured in a short time.

When the drive of the engine is controlled based on the target engine speed corresponding to the detected engine torque, the same advantage as that when the drive of the engine is controlled based on the target engine speed corresponding to the detected pump displacement can be attained.

Further, when the drive of the engine is controlled based on the target engine speed corresponding to the detected engine torque, the maximum rated horsepower point of the engine is passed through on the torque chart. Incidentally, in a situation where the first target engine speed is not realized when the drive of the engine is controlled based on the target engine speed corresponding to the detected pump displacement, the maximum horsepower point, which is smaller than the maximum rated horsepower point, is passed through on the torque chart.

Accordingly, a control can be performed in each high-speed control area. According to the invention, such a control in each high-speed control area is involved in engine controls based on the first target engine speed, the second target engine speed and the target engine speed, corresponding to the detected pump displacement or the detected engine torque, between the first target engine speed and the second target engine speed.

BEST MODE FOR CARRYING OUT THE INVENTION

Exemplary embodiments of the invention will be specifically described below with reference to the attached drawings. An engine control device and an engine control method according to the invention can be favorably employed as a control device and a control method for controlling a diesel engine installed in a work vehicle such as a hydraulic excavator, a bulldozer and a wheel loader.

Additionally, the engine control device and the engine control method according to the invention may be arranged or configured in any manner other than those described below as long as they serve to attain an object of the invention. Accordingly, the invention is not limited to the exemplary embodiments described below but various modifications or changes can be made thereto.

EXAMPLES

Figure 1:
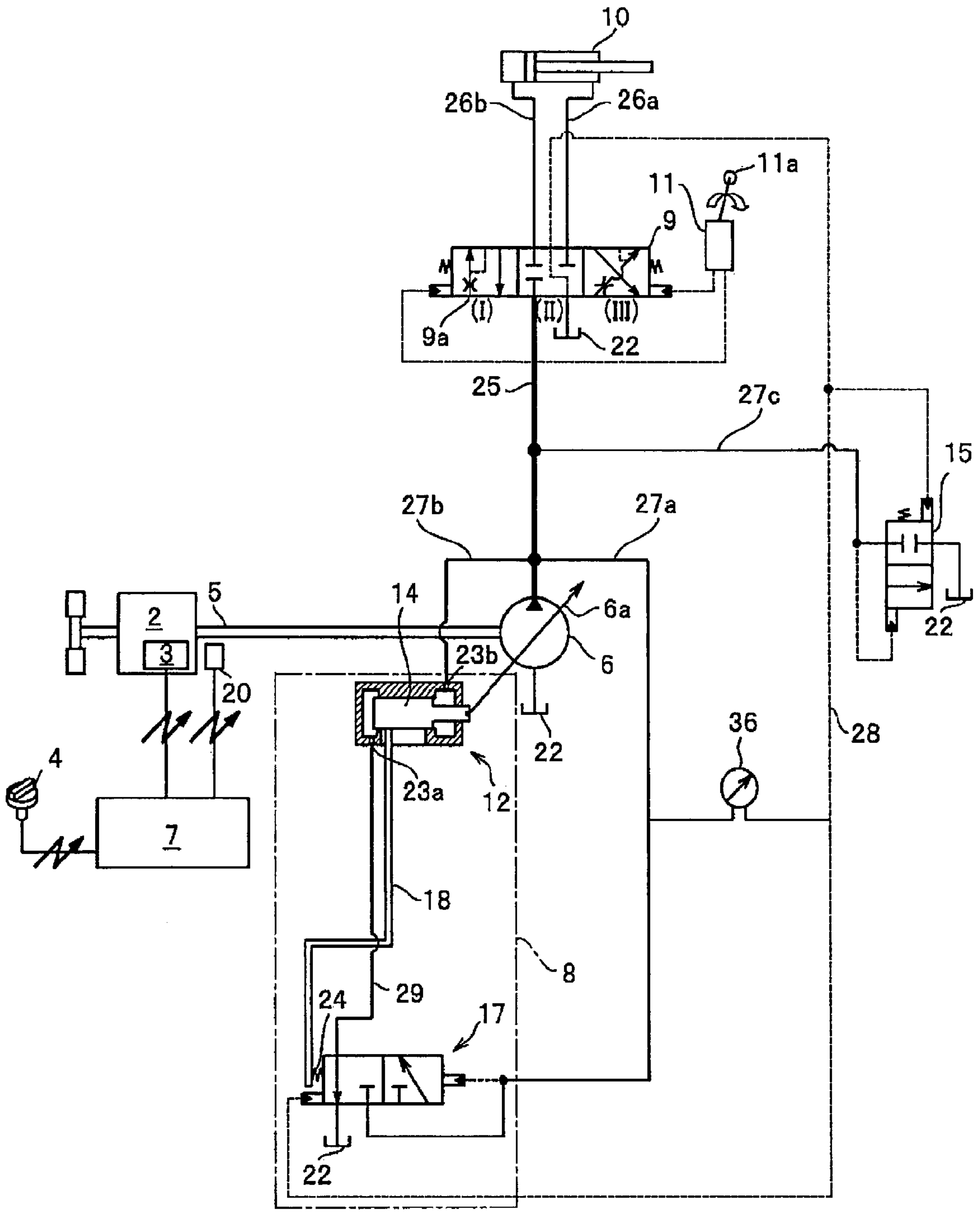
FIG. 1 is a hydraulic circuit diagram according to an exemplary embodiment of the invention. (Example)

FIG. 1 is a hydraulic circuit diagram of an engine control device and an engine control method according to an exemplary embodiment of the invention.

An engine 2 is a diesel engine. The engine torque of the engine 2 is controlled by adjusting the amount of fuel discharged into a cylinder of the engine 2. A typically-known fuel injection device 3 serves to adjust the fuel amount.

An output shaft 5 of the engine 2 is connected to a variable displacement hydraulic pump 6 (hereinafter referred to as a hydraulic pump 6), so that the rotation of the output shaft 5 drives the hydraulic pump 6. The inclination angle of a swash plate 6*a* of the hydraulic pump 6 is controlled by a pump control device 8. A change in the inclination angle of the swash plate 6*a* leads to a change in a pump displacement D(cc/rev) of the hydraulic pump 6.

The pump control device 8 includes: a servo cylinder 12 that controls the inclination angle of the swash plate 6*a*; and an LS valve (Load Sensing valve) 17 that is controlled in response to a differential pressure between a pump pressure and a load pressure of a hydraulic actuator 10. The servo cylinder 12 includes a servo piston 14 that acts on the swash plate 6*a*. A discharge pressure from the hydraulic pump 6 is taken through oil paths 27*a*, 27*b*. The LS valve 17 is activated in response to a differential pressure between the discharge pressure that is taken through the oil path 27*a* and the load pressure of the hydraulic actuator 10 that is taken through a pilot oil path 28, whereby controlling the servo piston 14.

The inclination angle 6*a* of the hydraulic pump 6 is controlled by the servo piston 14. Moreover, a control valve 9 is controlled in response to the operation amount of a control lever 11*a*, whereby controlling the flow volume supplied to the hydraulic actuator 10. The pump control device 8 is provided by a known load sensing control device.

A pressure oil discharged from the hydraulic pump 6 is supplied to the control valve 9 through an oil discharge path 25. The control valve 9 is configured as a switching valve that allows switching to a 5 port 3 position. The pressure oil discharged from the control valve 9 is selectively supplied to the oil paths 26*a*, 26*b*, whereby the hydraulic actuator 10 is actuated.

Incidentally, it is not to be understood that the hydraulic actuator is limited to the above-exemplified cylinder hydraulic actuator. The hydraulic actuator may be provided by a hydraulic motor or a rotary hydraulic actuator. Further, though only one pair of the control valve 9 and the hydraulic actuator 10 is exemplified above, a plural pairs of the control valves 9 and the hydraulic actuators 10 may be provided or a plurality of hydraulic actuators may be actuated by one control valve.

Specifically, when a hydraulic excavator, for instance, is taken as an example of a work vehicle for illustrating a hydraulic actuator, a hydraulic actuator is employed for each of a boom hydraulic cylinder, a bucket hydraulic cylinder, a left travel hydraulic actuator, a right travel hydraulic cylinder, a turning motor and the like. FIG. 1 shows the boom hydraulic cylinder, for instance, as a specific example of these hydraulic actuators.

When the control lever 11*a* is moved from a neutral position, a pilot pressure is supplied from a control lever unit 11 according to the operated direction and operation amount of the control lever 11*a*. The pilot pressure is applied to either the left pilot port or the right pilot port of the control valve 9. In this manner, the control valve 9 is switched from a (II) position (neutral position) to either one of left and right positions, namely a (I) position and a (III) position.

When the control valve 9 is switched from the (II) position to the (I) position, the discharge pressure oil from the hydraulic pump 6 is supplied to the bottom side of the hydraulic actuator 10 through the oil path 26*b*, whereby a piston of the hydraulic actuator 10 is expanded. At this time, the pressure oil at the head side of the hydraulic actuator 10 is discharged into a tank 22 from the oil path 26*a* via the control valve 9.

Likewise, when the control valve 9 is switched to the (III) position, the discharge pressure oil from the hydraulic pump 6 is supplied to the head side of the hydraulic actuator 10 through the oil path 26*b*, whereby the piston of the hydraulic actuator 10 is retracted. At this time, the pressure oil at the bottom side of the hydraulic actuator 10 is discharged into the tank 22 from the oil path 26*b* via the control valve 9.

An oil path 27*c* is branched from the middle of the oil discharge path 25. An unload valve 15 is disposed in the oil path 27*c*. The unload valve 15 is connected to the tank 22. The unload valve 15 can be switched between a position where the oil path 27*c* is cut off and a position where the oil path 27*c* is in communication. The oil pressure in the oil path 27*c* acts as a pressing force for switching the unload valve 15 to the communication position.

Further, a pilot pressure in the pilot oil path 28 where the discharge pressure of the hydraulic actuator 10 is taken and the spring force of a spring that provides a certain differential pressure act as a pressing force for switching the unload valve 15 to the cut-off position. Hence, the unload valve 15 is controlled based on a differential pressure between the combination of the pilot pressure in the pilot oil path 28 and the spring force of the spring and the oil pressure in the oil path 27*c*.

When an operator selects one of variable command values by turning a fuel dial 4 as a command unit, a target engine speed associated with the selected command value is set. According to the selected target engine speed, namely a first target engine speed, a high-speed control area where an engine load and an engine torque are matched is set.

Figure 2:
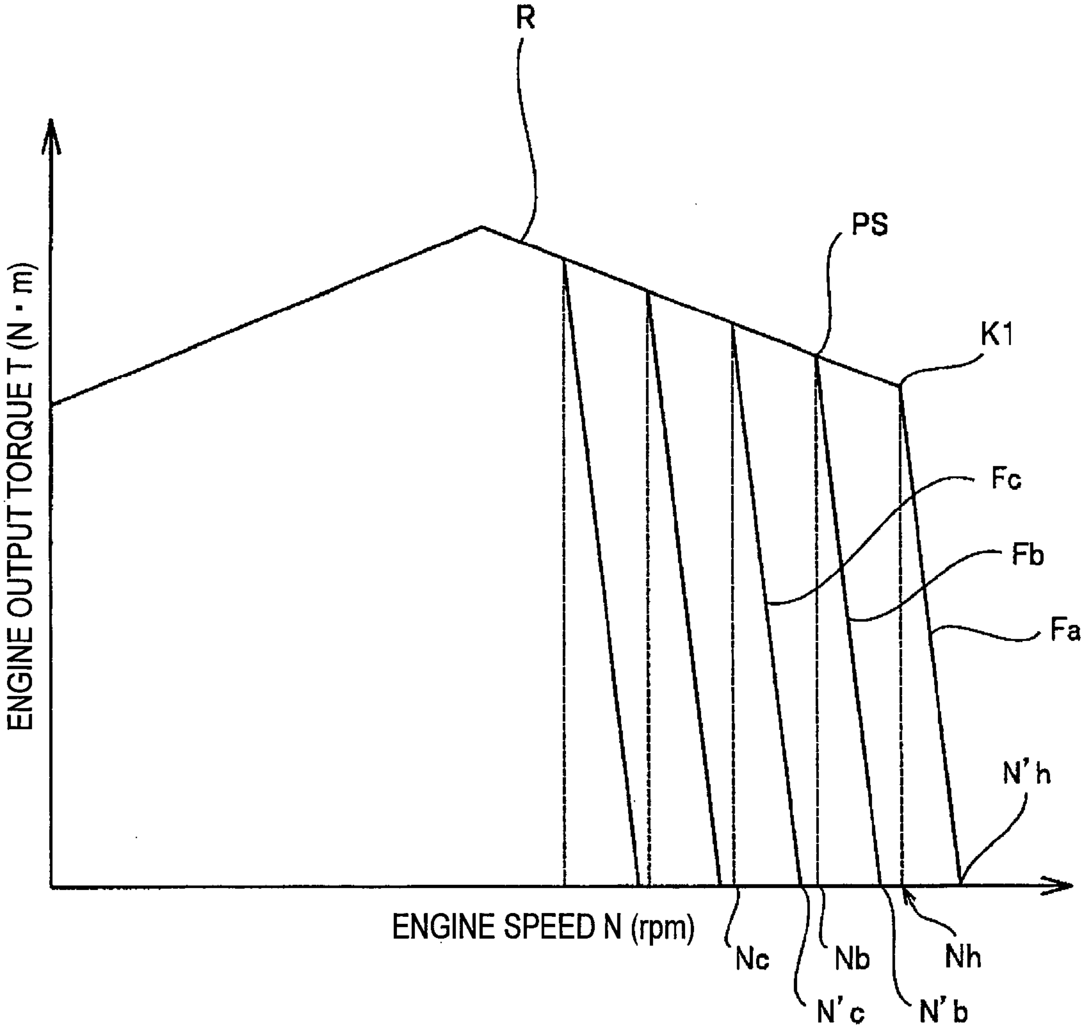
FIG. 2 is a torque chart of an engine. (Example)

In other words, as shown in FIG. 2, when a target engine speed Nb(N'b) as the first target engine speed is set by turning the fuel dial 4, a high-speed control area Fb associated with the target engine speed Nb(N'b) is selected. At this time, the target engine speed is Nb(N'b).

Incidentally, the target engine speed Nb is defined as a point where the total of a non-load engine friction torque and a hydraulic loss torque and the engine torque are matched when the target engine speed is controlled at Nb. In an actual engine control, a line connecting the target engine speed Nb and a matching point Ps is set as the high-speed control area Fb.

When the operator sets a relatively low target engine speed Nc(N'c) different from the previously-selected first target engine speed Nb(N'b) by turning the fuel dial 4, a high-speed control area Fc is selected. The high-speed control area Fc is defined on a relatively low-speed side. The target engine speed Nc(N'c) is set as a second target engine speed.

In this manner, the fuel dial 4 is set, whereby one high-speed control area associated with the selected target engine speed is set. Specifically, the fuel dial 4 is turned to select, for instance, one of the high-speed control area Fa including a maximum rated horsepower point K1 as shown in FIG. 2 and a plurality of the high-speed control areas Fb, Fc . . . on the low-speed side relative to the high-speed control area Fa. The fuel dial 4 is also turned to select one of high-speed control areas defined between the above high-speed control areas.

Figure 3:
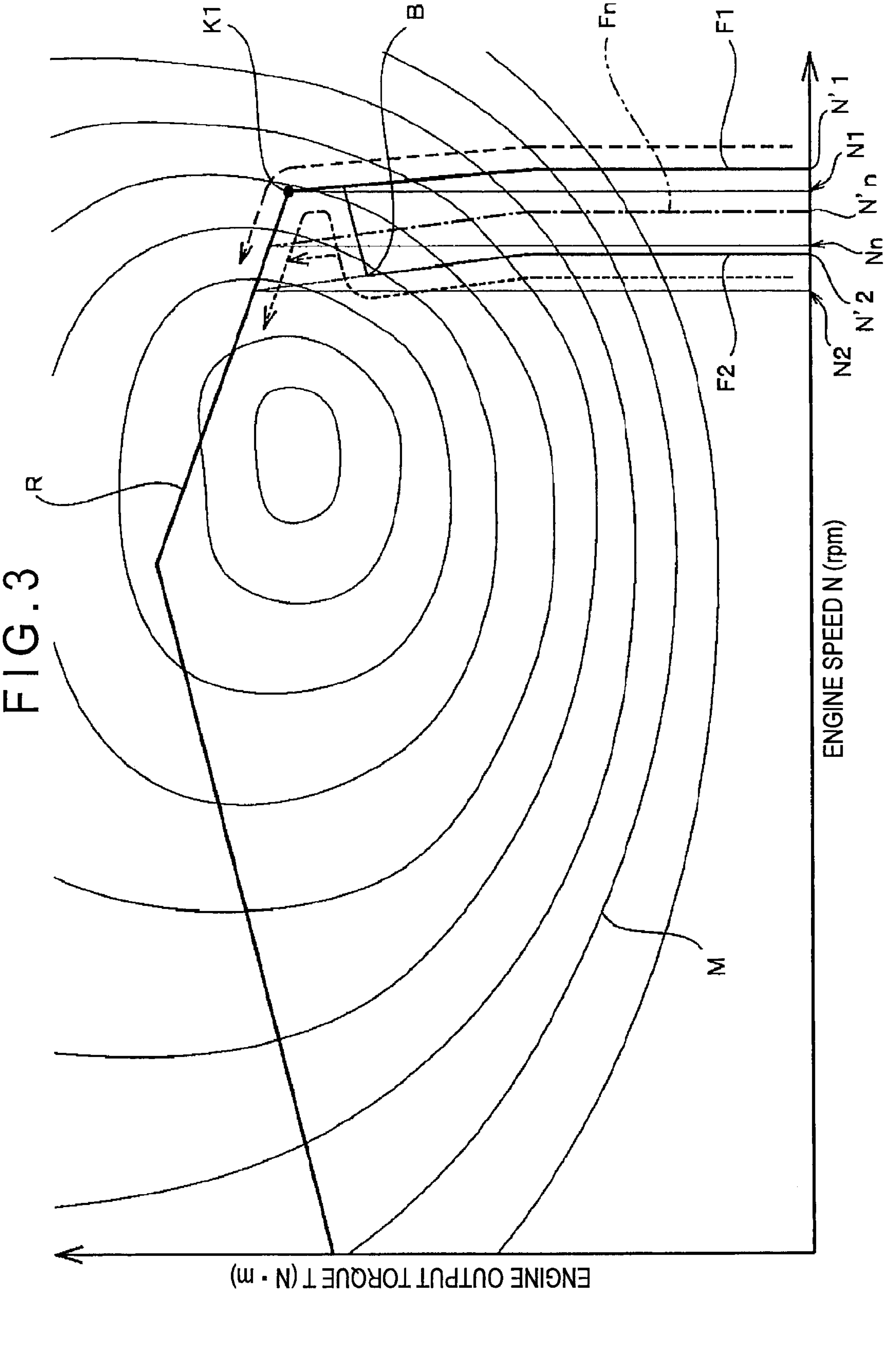
FIG. 3 is a torque chart when an engine torque is increased. (Example)

In the torque chart of FIG. 3, the possible performance of the engine 2 is shown as an area defined by a maximum torque line R. The output (horsepower) of the engine 2 peaks at the maximum rated horsepower point K1 on the maximum torque line R (hereinafter referred to as the maximum rated horsepower point K1). M denotes an equal fuel consumption curve. The minimum fuel consumption area is defined at the center side of the equal fuel consumption curve.

Description will be made below on an explanatory situation where a target engine speed N1(N'1) is set as the maximum target engine speed according to a command value set using the fuel dial 4 and the high-speed control area F1 including the maximum rated horsepower point K1 is set according to the target engine speed N1(N'1). In other words, description will be made on the situation where the target engine speed N1(N'1) is set as the first target engine speed. A control flow for changing the maximum torque on the high-speed control area F1 while matching the engine load and the engine torque is illustrated using the control flow chart of FIG. 5 and the block diagram of FIG. 6 with reference to mainly FIGS. 1, 3 and 4.

Description will be made below on the situation where the maximum target engine speed N1(N'1), which is associated with the high-speed control area F1 including the maximum rated horsepower point K1, is set as the first target engine speed according to the command value of the fuel dial 4. However, the invention is not limited to the situation where the high-speed control area F1 including the maximum rated horsepower point K1 is set. Even if one of the high-speed control areas Fb, Fc . . . in FIG. 2 or one of the high-speed control areas defined between the high-speed control areas Fb, Fc . . . is selected according to the first target engine speed N1, the invention is favorably applied to the selected high-speed control area.

Figure 4:
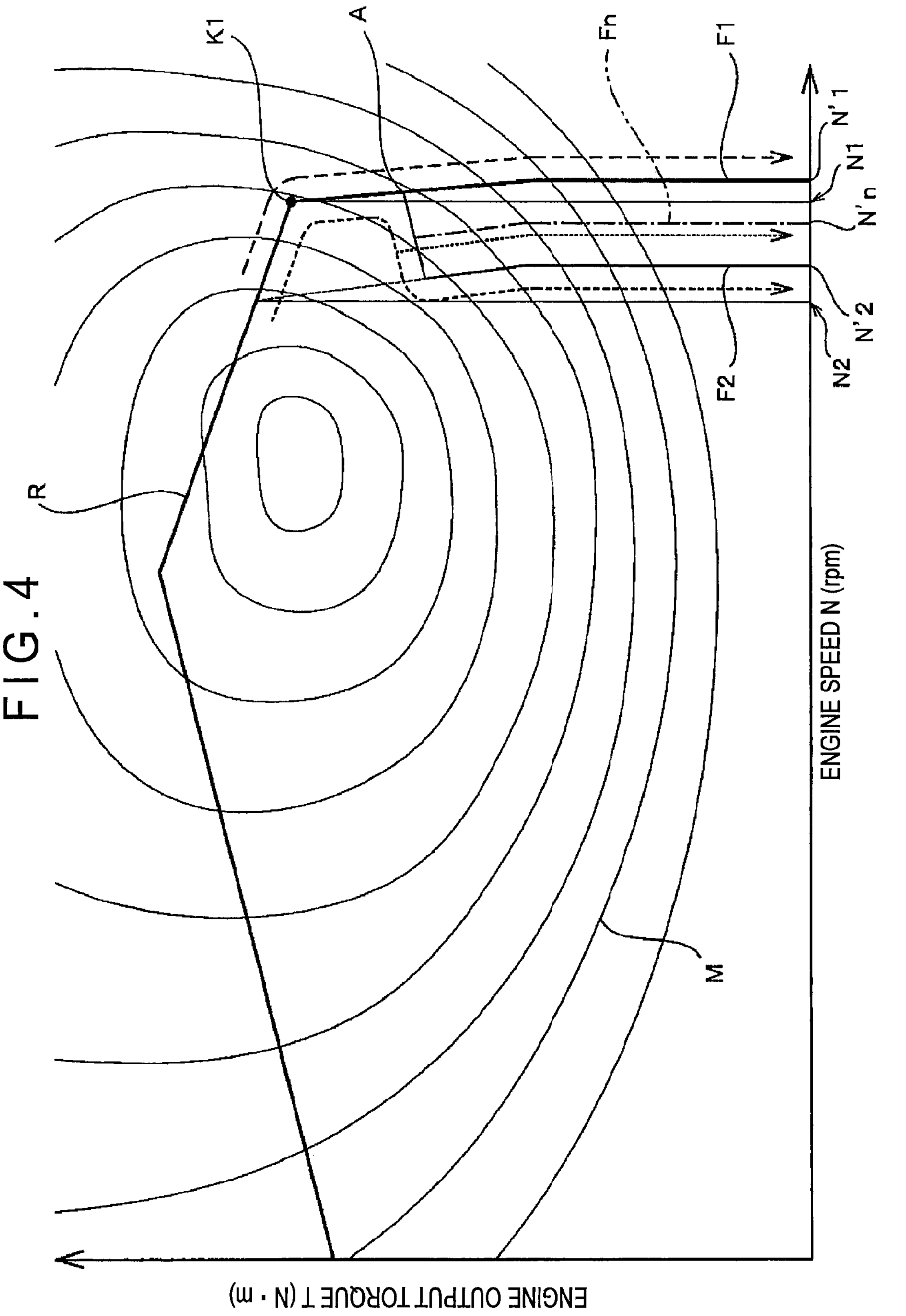
FIG. 4 is a torque chart when the engine torque is reduced. (Example)
Figure 7:
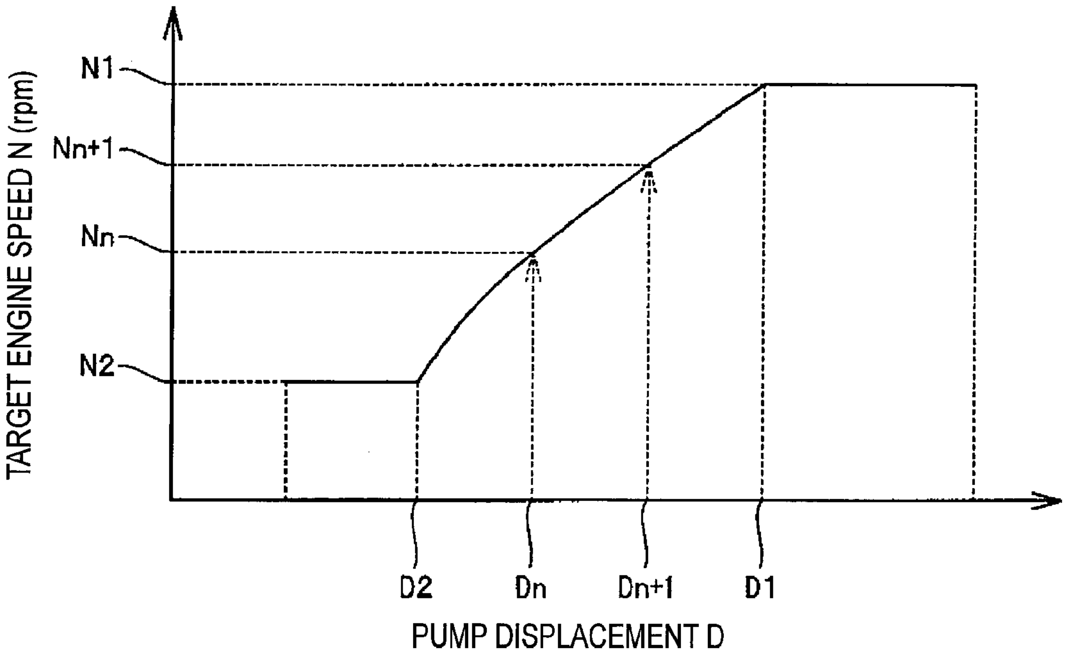
FIG. 7 is a graph showing a relationship between a pump displacement and a target engine speed. (Example)
Figure 8:
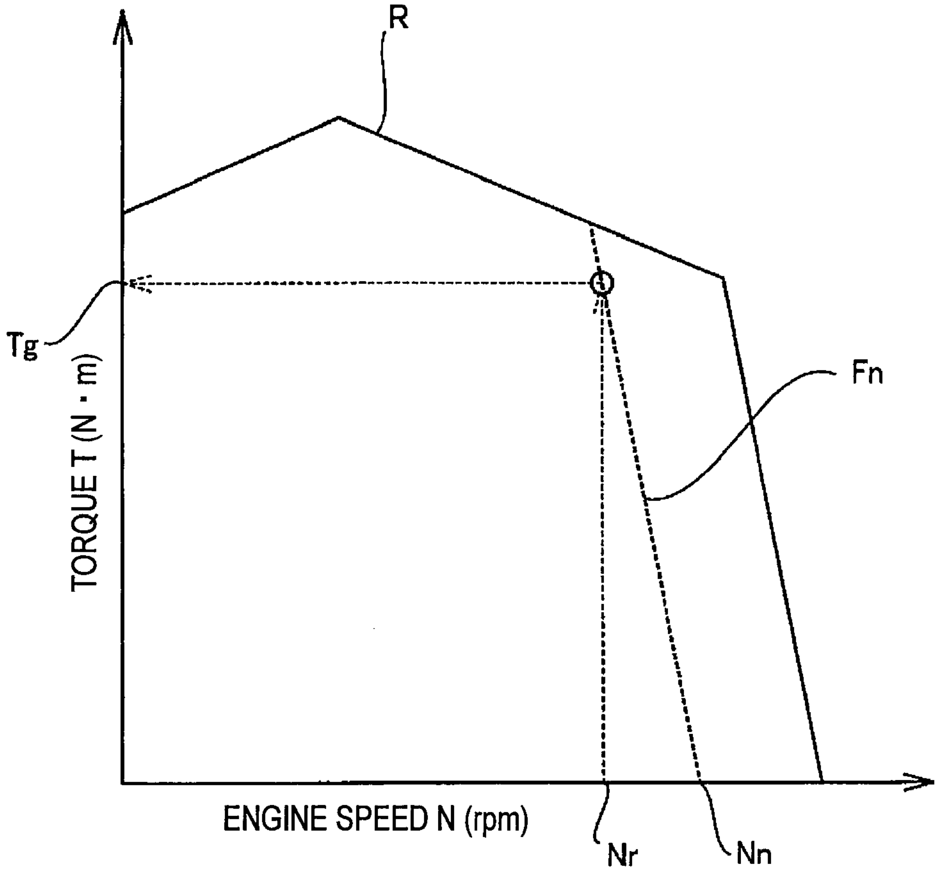
FIG. 8 is a graph showing a relationship between an engine speed and the engine torque. (Explanatory Example)
Figure 9:
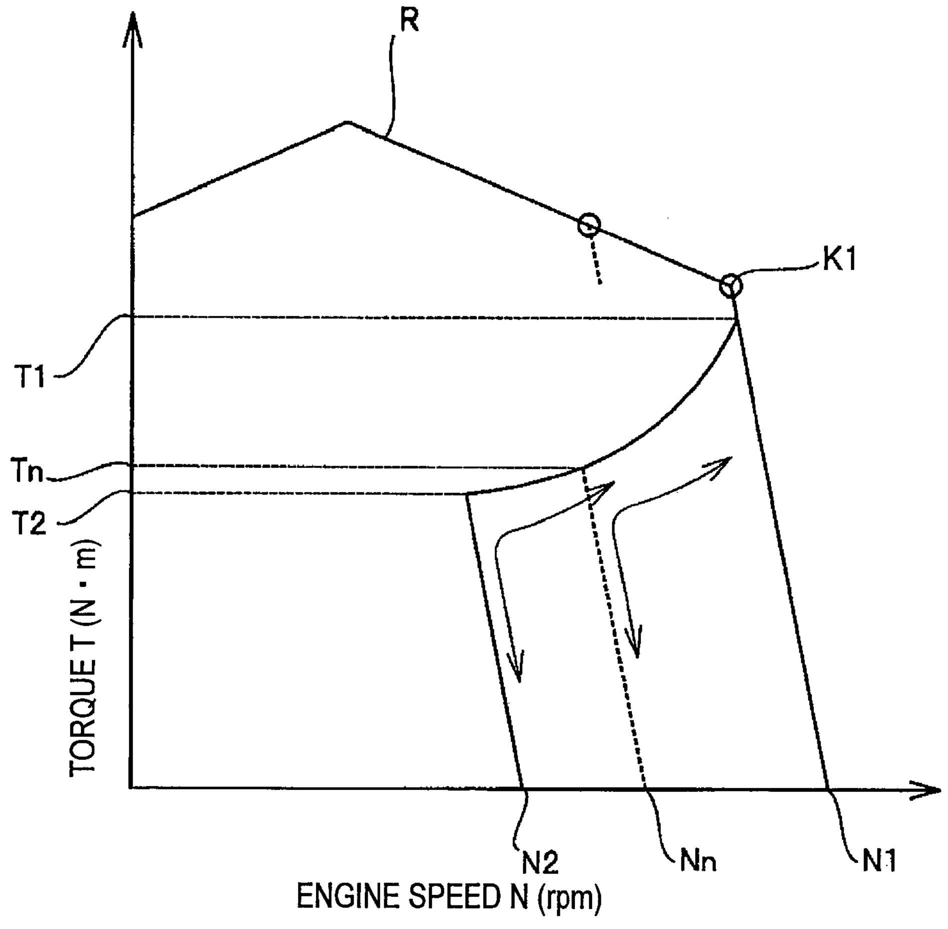
FIG. 9 is a graph showing a relationship between the engine speed and the engine torque. (Example)
Figure 10:
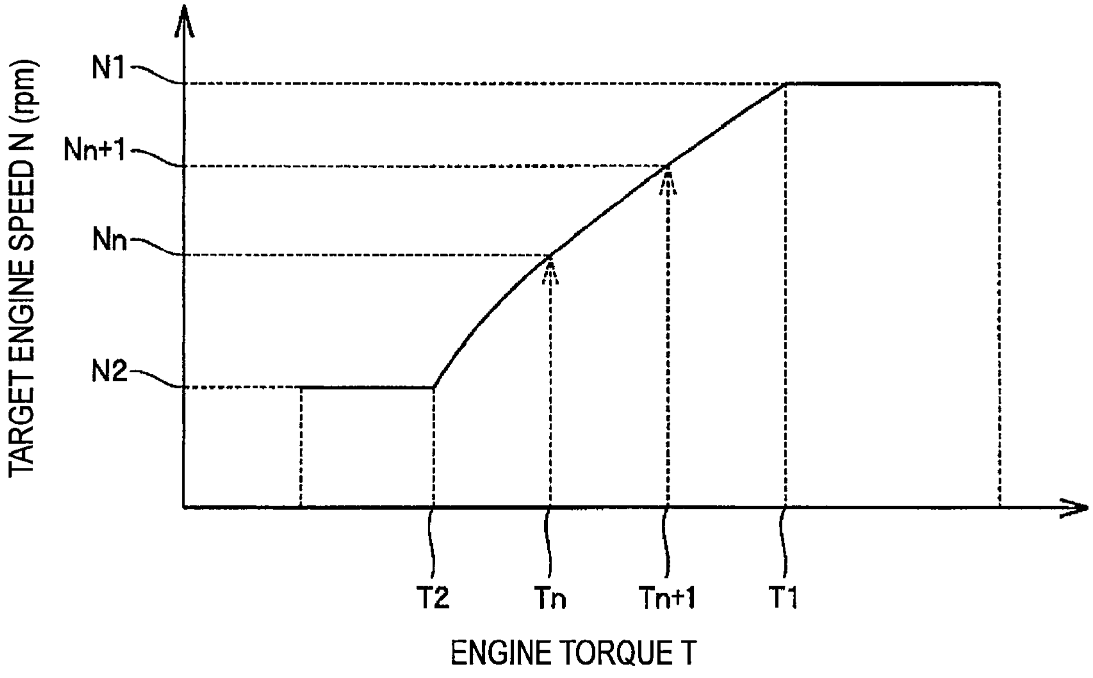
FIG. 10 is a graph showing a relationship between the engine torque and a target engine speed. (Example)

FIG. 3 shows an increase in the engine torque and FIG. 4 shows a decrease in the engine torque. FIG. 7 is a graph showing a relationship between the detected pump displacement D and the target engine speed. FIGS. 8 to 10 are graphs each showing a relationship between the detected engine torque and the target engine speed. FIG. 8 is a graph for estimating the engine torque and FIG. 9 shows estimation based on the detected engine torque. FIG. 10 shows a relationship between the detected engine torque and the target engine speed.

Figure 5:
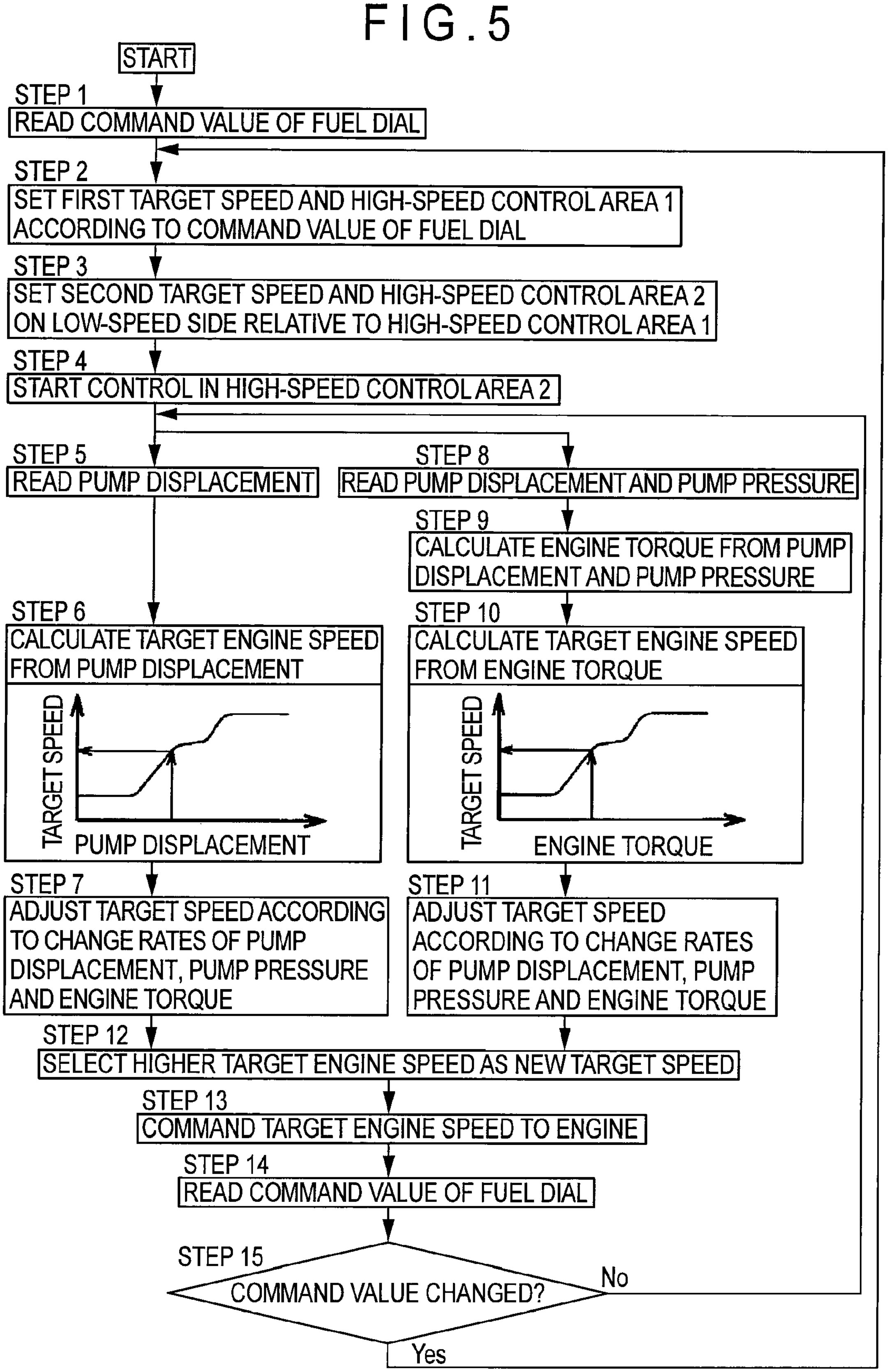
FIG. 5 is a control flow chart according to the invention. (Example)
Figure 6:
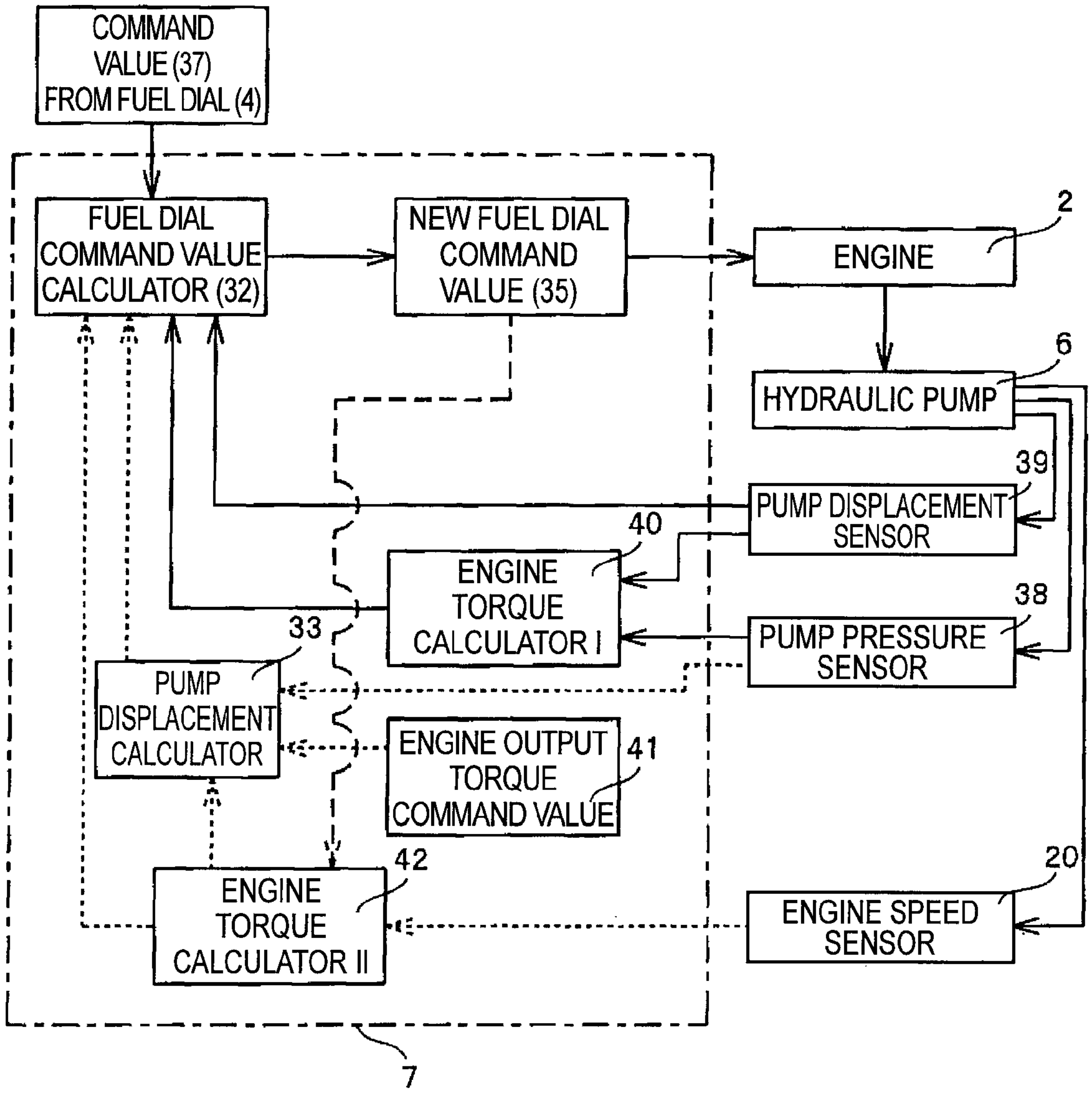
FIG. 6 is a block diagram of a controller. (Example)

FIG. 5 shows a control flow. In FIG. 6, a portion surrounded by a dash-dot line represents a controller 7. The relationship between the pump displacement D and the target engine speed N shown in FIGS. 5 and 7 and the relationship between the detected torque T and the target engine speed N shown in FIGS. 5 and 10 are mere examples, and therefore they can be replaced with the other relation curves or the like.

Description will be made first on the control of the controller 7. In FIG. 6, a fuel dial command value calculator 32 within the controller 7 is supplied with not only a command value 37 of the fuel dial 4 but also a detected pump displacement of the hydraulic pump 6 and a detected engine torque. The fuel dial command value calculator 32 includes a first setting unit 32*a* and a second setting unit 32*b*. The first setting unit 32*a* and the second setting unit 32*b* will be described later.

The fuel dial command value calculator 32 outputs a target engine speed of the engine 2 to determine a new fuel dial command value 35. The new fuel dial command value 35 is supplied to the fuel injection device 3 of the engine 2 (see FIG. 1) to control the drive of the engine 2.

The pump displacement of the hydraulic pump 6 to be supplied to the fuel dial command value calculator 32 is detected directly via a detection signal from a pump displacement sensor 39 or detected based on a pump displacement calculated by a pump displacement calculator 33.

The pump displacement calculator 33 is supplied with a pump discharge pressure detected by a pump pressure sensor 38 and an engine torque command value 41 or an output signal from an engine torque calculator II(42). In general, a relationship between the pump discharge pressure P of the hydraulic pump 6, the discharge capacity D (pump displacement D) and the engine torque T (engine torque T) is expressed by an equation $T=P\cdot D/200\pi$. With an equation $D=200\pi\cdot T/P$, which is derived by the above equation, the current pump displacement D of the hydraulic capacity 6 is calculated.

Incidentally, the pump pressure sensor 38 can be disposed, for instance, in such a manner as to detect the pump pressure in the hydraulic oil path 25 of FIG. 1. Further, the pump displacement sensor 39 can be configured as a sensor or the like capable of detecting the swash-plate angle of the hydraulic pump 6.

The engine torque command value 41 is held in the controller for engine control. The pump displacement calculator 33 detects the pump displacement by dividing the engine torque command value 41 or the engine torque value output from the engine torque calculator II(42) by the pump discharge pressure detected by the pump pressure sensor 38.

The engine torque calculator II(42) is supplied with the engine speed detected by an engine speed sensor 20 and the new fuel dial command value 35. The pump displacement engine torque calculator II(42) calculates the engine torque based on the values supplied thereto with reference to the relationship diagram between the engine torque T and the engine speed N shown in FIG. 8, or the like.

Specifically, as shown in FIG. 8, a current estimated torque Tg is obtained based on a current target engine speed Nn. More specifically, the current estimated torque Tg is obtained as an intersection of a current engine speed Nr, which is detected by the engine speed sensor 20, with a high-speed control area Fn determined by the new fuel dial command value 35 according to the target engine speed Nn.

Incidentally, the engine torque calculator II(42) is also capable of calculating the current engine torque based on the engine torque command value 41 and the engine speed detected by the engine speed sensor 20.

The detected engine torque supplied to the fuel dial command value calculator 32 corresponds to a torque value output from the engine torque calculator I(40) or the engine torque calculator II(42).

The engine torque calculator II(42) performs the above-described calculation to obtain the engine torque. The engine torque calculator I(40) calculates the output torque of the hydraulic pump 6 based on the pump displacement detected by the pump displacement sensor 39 and the pump discharge pressure detected by the pump pressure sensor 38. The calculated output torque is assumed as the current engine torque.

In FIG. 6, broken lines denote the input signals and output signals of the pump displacement calculator 33, the engine torque command value 41 and the engine torque calculator II(42), respectively. This is because these calculators and command value can be used as an alternative for obtaining the pump displacement and the engine torque.

Next, description will be made on the control flow of FIG. 5.

At Step 1 in FIG. 5, the controller 7 reads the command value of the fuel dial 4. The process then goes to Step 2.

At Step 2, the controller 7 sets the first target engine speed N1(N'1) in response to the command value of the fuel dial 4, whereby the high-speed control area F1 associated with the first target engine speed N1(N'1) is set.

Incidentally, though it is described above that the first target engine speed N1 (N'1) of the engine 2 is first set in response to the command value of the fuel dial 4, the high-speed control area F1 can be first set and the associated first target engine speed N1(N'1) is set. Alternatively, both the first target engine speed N1(N'1) and the high-control speed area F1 can be simultaneously set in response to the command value of the fuel dial 4.

As shown in FIG. 3, when the first target engine speed N1(N'1) and the high-speed control area F1 are set, the process goes to Step 3.

Incidentally, in FIG. 3, a line connecting the high-idle point N'1 of the maximum target engine speed N1 and the maximum rated horsepower point K1 corresponds to the high-speed control area F1. As described above for explaining the high-speed control area Fb with reference to FIG. 2, the high-idle point N'1 can be defined as a point where the total of the engine torque and a non-load engine friction torque and a hydraulic loss torque are matched when the target engine speed is controlled at the maximum target engine speed Nh.

At Step 3, the controller 7 determines the second target engine speed N2(N'2) defined on a low-speed side and a high-speed control area F2 associated with the second target engine speed N2(N'2) with the assistance of the first setting unit 32*a*. The second target ending speed N2(N'2) and the high-speed control area F2 corresponding to the first target engine speed N1(N'1) and the high-speed control area F1 are respectively determined in advance.

The high-speed control area F2 may be determined in advance as a high-speed control area where an operation speed does not substantially decrease under the load sensing control during an operation of the control lever 11*a* of a hydraulic excavator as compared with the operation at the high-speed control area F1.

Specifically, the target engine speed N2 associated with the high-speed control area F2 can be reduced by, for instance, 10% as compared with the target engine speed N1 associated with the high-speed control area F1. Though the above description is made on the situation where the target engine speed is reduced by 10%, this percentage is a mere example, and therefore the invention is not limited thereto.

In this manner, the high-speed control area F2, defined on the low-speed side relative to the high-speed control area F1, can be determined in advance as a high-speed control area corresponding to each high-speed control area F1 set using the fuel dial 4.

When the controller 7 determines the high-speed control area F2, the process goes to Step 4.

At step 4, when the operation lever 11*a* is operated, the controller 7 controls the fuel injection device 3 so that matching between the engine load and the engine torque is realized on the high-speed control area F2 as shown by a fine dot line in FIG. 3.

When an operator operates the operation lever 11*a* to accelerate the work equipment speed of a hydraulic excavator, a control process starting from Step 5 or a control process starting from Step 8 is performed. As described later, in the usage of both the target engine speed N associated with the detected pump displacement D and the target engine speed N associated with the detected engine torque T, both the control processes of Steps 5 and 8 are performed.

Steps 5 to 7 are provided as control steps for obtaining the target engine speed N associated with the detected pump displacement D of the hydraulic pump 6. Steps 8 to 11 are provided as control steps for obtaining the target engine speed N associated with the detected engine torque T. The second setting unit 32*b* serves to perform the control process of Steps 5 to 7 and that of Steps 8 to 11.

Description will first be made on Steps 5 to 7 as control steps for obtaining the target engine speed corresponding to the detected pump displacement.

At Step 5, the pump displacement D of the hydraulic pump 6 detected by the pump displacement sensor 39 is read out. After reading of the pump displacement D at Step 5, the process goes to Step 6. The pump displacement D may be obtained according to the relationship between the pump discharge pressure P, the discharge capacity D (pump displacement D) and the engine torque T (engine torque T) or the like as described above.

The following is a brief description on the process at Step 6 for obtaining the target engine speed N associated with the detected pump displacement D. As shown in FIG. 7, when the engine is controlled to be driven based on the second target engine speed N2, the second target engine speed N2 is maintained until the pump displacement D of the hydraulic pump 6 reaches a second predetermined pump displacement D2.

When the detected pump displacement D of the hydraulic pump 6 becomes the second predetermined pump displacement D2 or greater, the target engine speed N corresponding to the pump displacement D is obtained based on the predetermined relationship between the pump displacement D and the target engine speed N shown in FIG. 7. At this time, the drive of the engine 2 is controlled so that the engine 2 is driven at the obtained target engine speed Nn.

Until the target engine speed Nn reaches the first target engine speed N1 or the second target engine speed N2, the target engine speed Nn corresponding to the detected pump displacement Dn is continually obtained. The engine 2 is thus controlled to be driven at the obtained target engine speed Nn all the time.

When the currently-detected pump displacement D is the pump displacement Dn, the target engine speed N is obtained as the target engine speed Nn. Upon detection of an increase from the pump displacement Dn to a pump displacement Dn+1, a target engine speed Nn+1 corresponding to the pump displacement Dn+1 is newly obtained according to FIG. 7. The drive of the engine 2 is controlled so that the engine 2 is driven at the newly-obtained target engine speed Nn+1.

When the detected pump displacement D reaches a first predetermined pump displacement D1, the engine 2 is controlled to be driven based on the first target engine speed N1. When the engine 2 is controlled to be driven according to the first target engine speed N1, the first target engine speed N1 is maintained until the pump displacement D of the hydraulic pump 6 falls to or below the first predetermined pump displacement D1.

When the detected pump displacement D reaches the maximum torque R shown in FIG. 3 while the pump displacement D is between the first predetermined pump displacement D1 and the second pump displacement D2, the engine control is performed along the maximum torque line R.

Referring back to FIG. 5, the description on Step 6 goes on. When the target engine speed N corresponding to the detected pump displacement D is obtained based on the predetermined relationship between the pump displacement D and the target engine speed N at Step 6, the process goes to Step 7.

At Step 7, the value of the target engine speed N is adjusted according to the change rate of the pump displacement of the hydraulic pump 6, the change rate of the pump discharge pressure, and the change rate of the engine torque T. When these change rates (i.e. increase rates) are relatively high, the target engine speed N can be adjusted to a high-speed side.

Incidentally, Step 7, described above as a control step for adjusting the value of the target engine speed N, may be skipped.

Next, description will be made on Steps 8 to 11 as control steps for obtaining the target engine speed corresponding to a detected engine torque.

According to Steps 8 to 11, the description is directed to the configuration where the engine torque T is output from the engine torque calculator I(40) in response to the detection signals from the pump displacement sensor 39 and the pump pressure sensor 38 shown in FIG. 6. However, the engine torque calculator II(42) and the like can also be used to detect the engine torque T as described above. Since the description is made above on the engine torque calculator I(40) and the engine torque calculator II(42), description on calculation of the engine torque T by the engine torque calculator I(40) or the engine torque calculator II(42) is omitted here.

When the detection signals from the pump displacement sensor 39 and the pump pressure sensor 38 are read out at Step 8, the process goes to Step 9.

At Step 9, the engine torque T is calculated based on the detection signals read at Step 8. After the engine torque is calculated, the process goes to Step 10.

The following is a brief description on the process at Step 10 for obtaining the target engine speed N corresponding to the detected engine torque T. As shown in FIG. 10, when the engine is controlled to be driven based on the second target engine speed N2, the second target engine speed N2 is maintained until the detected engine torque T reaches a second predetermined engine torque T2.

When the detected engine torque T becomes the second predetermined engine torque T2 or greater, the target engine speed N corresponding to the detected engine torque T is obtained based on the predetermined relationship between the engine torque T and the target engine speed N shown in FIG. 10. The drive of the engine 2 is controlled so that the engine 2 is driven at the obtained target engine speed N.

Until the target engine speed N reaches the first target engine speed N1 or the second target engine speed N2, the target engine speed N corresponding to the detected engine torque T is continually obtained. The engine 2 is thus controlled to be driven based on the target engine speed N all the time.

When the currently-detected engine torque T is, for instance, an engine torque Tn, the target engine speed Nn is obtained. When the engine torque T increases from the engine torque Tn to an engine torque Tn+1, the target engine speed Nn+1 corresponding to the engine torque Tn+1 is newly obtained according to FIG. 10. The drive of the engine 2 is thus controlled so that the engine 2 is driven at this newly-obtained target engine speed Nn+1.

When the detected engine torque T reaches a first predetermined engine torque T1, the engine 2 is controlled to be driven based on the first target engine speed N1. When the engine 2 is controlled to be driven based on the first target engine speed N1, the first target engine speed N1 is maintained until the detected engine torque T falls to or below the first predetermined engine torque T1.

Further, the drive of the engine 2 is controlled by obtaining the target engine speed N corresponding to the detected engine torque T, whereby the engine torque line is allowed to pass through the maximum rated horsepower point of the engine 2 as shown in FIG. 9.

Referring back to FIG. 10, when the detected engine torque T changes to the engine torque Tn+1 from a previously-detected value within a range between the first predetermined engine torque T1 and the second predetermined engine torque T2, the target engine speed Nn+1 corresponding to the engine torque Tn+1 is obtained. The drive control of the engine 2 is thus sequentially performed based on the newly-obtained target engine speed Nn+1.

Referring back to FIG. 5, the description on Step 10 goes on. When the target engine speed N corresponding to the detected engine torque T is obtained based on the predetermined relationship between the engine torque t and the target engine speed N at Step 10, the process goes to Step 11.

At Step 11, the value of the target engine speed N is adjusted according to the change rate of the pump displacement of the hydraulic pump 6, the change rate of the pump discharge pressure, and the change rate of the engine torque T. When these change rates (i.e. increase rates) are relatively high, the target engine speed N can be adjusted to a high-speed side.

Incidentally, Step 11, described above as a control step for adjusting the value of the target engine speed N, may be skipped.

When higher one of the target engine speed N corresponding to the detected pump displacement D and the target engine speed N corresponding to the detected engine torque T is used, both the control process of Steps 5 to 7 and that of Steps 8 to 11 are performed. In this case, a control in Step 12 is performed after Step 7 and Step 11.

When the engine 2 is controlled to be driven based on the target engine speed N corresponding to the detected pump displacement D or the target engine speed N corresponding to the detected engine torque T, Step 12 is skipped and the process goes to Step 13.

At Step 12, higher one of the target engine speed N corresponding to the detected pump displacement D and the target engine speed N corresponding to the detected engine torque T is selected. After the higher target ensign speed N is selected, the process goes to Step 13.

At Step 13, the new fuel dial command value 35 shown in FIG. 6 is supplied to control the engine to be driven based on the target engine speed N. At Step 14, the new fuel dial command value 35 supplied at Step 13 is read out.

At Step 15, it is determined whether or not the newly-supplied new fuel dial command value 35 is different from the previously-supplied new fuel dial command value 35.

When it is judged that the newly-supplied new fuel dial command value 35 is different from the previously-supplied new fuel dial command value 35 at Step 15, the process goes back to Step 2 and the steps are repeated from Step 2. When it is judged that the newly-supplied new fuel dial command value 35 is not different from the previously-supplied new fuel dial command value 35, in other words, the new fuel dial command value 35 has not been changed, the process goes back to Step 5 or 8 and the steps are repeated from Step 5 or 8.

Next, a brief description will be made on a control during an operation with reference to FIG. 1. Specifically, description will be made on a control that is performed by detecting the pump displacement D when an operator deeply moves the control lever 11*a* to accelerate the work equipment speed of a hydraulic excavator. Description on a control performed by detecting the engine torque T is omitted because it is similar to the control performed by detecting the pump displacement D.

When the control lever 11*a* shown in FIG. 1 is deeply moved so that the control valve 9 is switched to, for instance, the (I) position, an opening area 9*a* of the control valve 9 at the (I) position is increased and a differential pressure is reduced between the pump discharge pressure in the oil path 25 and the load pressure in the pilot oil path 28. At this time, the pump control device 8, configured as a load sensing control device, operates for increasing the pump displacement D of the hydraulic pump 6.

Incidentally, the second predetermined pump displacement D2 may be set based on the value of the maximum pump displacement of the hydraulic pump 6 or set equal to or less than the maximum pump displacement. Description will be made below on an explanatory situation where a predetermined pump displacement is set as the second predetermined pump displacement D2. When the pump displacement of the hydraulic pump 6 is increased to the second predetermined pump displacement D2, the target engine speed N is adjusted from the second target engine speed N2 to one corresponding to the detected pump displacement D shown in FIG. 7.

The values of a variety of parameters, which are described below, may be used to detect that the pump displacement of the hydraulic pump 6 becomes the second predetermined pump displacement D2. A pump displacement detector may be provided by a detector capable of detecting the values of a variety of parameters, which are described below.

When the value of the engine torque T is used as a parameter value for detecting the pump displacement D of the hydraulic pump 6, the controller 7 specifies a position on the high-speed control area F2 corresponding to the engine speed detected by the engine speed sensor 20 according to the torque chart stored in the controller 7. The value of the current engine torque is obtained based on the specified position. In this manner, by using the value of the engine torque as a parameter value, it can be detected that the discharge amount from the hydraulic pump 6 at the high-speed control area F2 becomes the maximum possible discharge amount from the hydraulic pump 6.

When the pump displacement of the hydraulic pump 6 is used as a parameter value, the relationship between the discharge pressure P of the hydraulic pump 6, the discharge capacity D (pump displacement D) and the engine torque T is expressed by an equation $T=P\cdot D/200\pi$. With an equation $D=200\pi\cdot T/P$, which is derived by the above equation, the current pump displacement of the hydraulic capacity 6 is obtained. The engine torque T may alternatively be set, for instance, according to an engine torque command value stored in the controller.

Alternatively, the pump displacement of the hydraulic pump 6 may be obtained by attaching a swash-plate angle sensor (not shown) to the hydraulic pump 6 to directly measure the pump displacement of the hydraulic pump 6. The pump displacement of the hydraulic pump 6 is obtained as described above and it is detected that the pump displacement of the hydraulic pump 6 becomes the second predetermined pump displacement D2 at the high-speed control area F2.

When an operator further deeply moves the control lever 11*a* after the pump displacement of the hydraulic pump 6 reaches the second predetermined pump displacement D2 at the high-speed control area F2, the drive of the engine 2 is controlled so that the engine 2 is driven at the target engine speed N corresponding to the detected pump displacement D shown in FIG. 7. At this time, a control is sequentially performed for shifting to an optimal high-speed control area within a range between the high-speed control area F2 and the high-speed control area F1.

A further increase in the load of the hydraulic actuator 10 after the shift to the high-speed control area F1 leads to an increase in the engine torque. When the load of the hydraulic actuator 10 is further increased at the high-speed control area F1, the pump displacement D of the hydraulic pump 6 is increased to the maximum pump displacement and the engine torque reaches the maximum rated horsepower point K1. After the load of the hydraulic actuator 10 is further increased and the engine torque T reaches the maximum torque line R between the high-speed control area F1 and the high-speed control area F2 or reaches the maximum rated horsepower point K1 in the high-speed control area F1, the engine speed and the engine torque are thereafter matched on the maximum torque line R.

Since the high-speed control area is shiftable as described above, the work equipment is capable of consuming the maximum horsepower as ever when the shift to the high-speed control area F1 is done.

In other words, when the shift from the high-speed control area F2 to the high-speed control area F1 is done, the engine torque is increased toward the maximum torque line R along the fine dot line shown in FIG. 3. The dash-dot line represents a pattern of an increase directly toward the maximum torque line R at the high-speed control area Fn defined in the middle of the shift from the high-speed control area F2 to the high-speed control area F1. The bold dot line represents a conventional pattern where a control is performed while the high-speed control area F1 is fixed. Incidentally, since the target engine speed N is changed according to the value of the detected pump displacement D or the detected engine torque T, the high-speed control area Fn is also changed.

A second set portion B may alternatively be determined as follows. Specifically, when a differential pressure between the discharge pressure of the hydraulic pump 6 and the load pressure of the hydraulic actuator 10 falls below a load sensing differential pressure, it is judged that the discharge flow from the hydraulic pump 6 is running short. Accordingly, the second set portion B may be determined at a position at which the differential pressure between the discharge pressure of the hydraulic pump 6 and the load pressure of the hydraulic actuator 10, which is once equal to the load sensing differential pressure, turns blow the load sensing differential pressure.

It is judged at this time that the pump discharge flow is running short on the high-speed control area F2. In other words, it is judged that the pump displacement of the hydraulic pump 6 reaches the second predetermined pump displacement D2 on the high-speed control area F2. Accordingly, a control is performed for shifting from the high-speed control area F2 to the high-speed side so that the engine is rotated at a high-rotation area.

Figure 11:
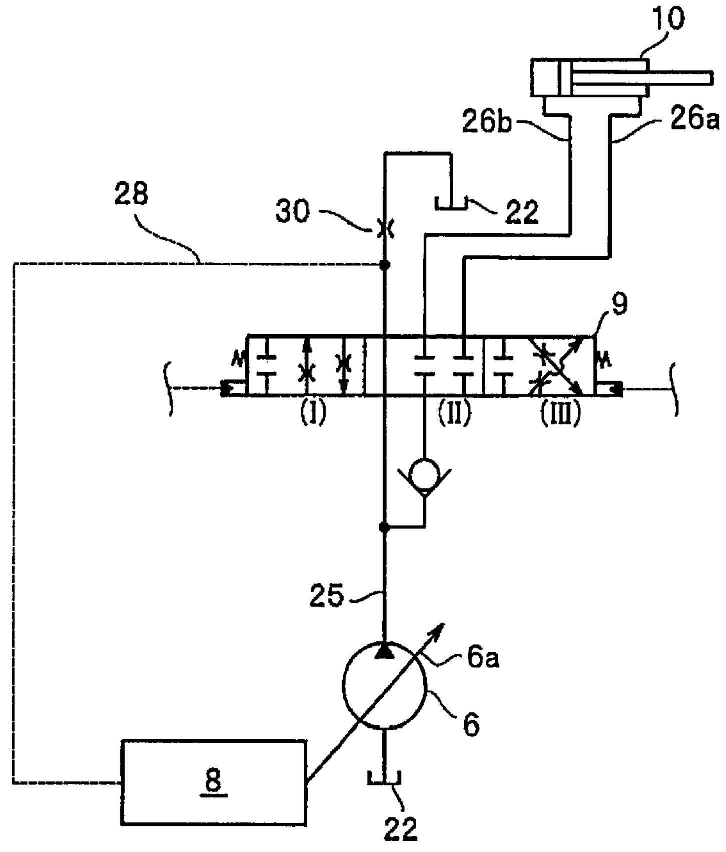
FIG. 11 is an open-center hydraulic circuit diagram. (Example)

In the above-described example, the hydraulic circuit is exemplified by the one including the load sensing control device. However, the pump displacement of the hydraulic pump 6 may be obtained according to the measured value of the engine speed and the torque chart of the engine, or alternatively, the pump displacement may be directly obtained by a pump swash-plate angle sensor also in an open-center hydraulic circuit as shown in FIG. 11.

A known hydraulic circuit used in a construction machine such as a hydraulic excavator includes the open-center hydraulic circuit. FIG. 11 shows a specific example of the open-center hydraulic circuit. In FIG. 11, a device represented by a reference numeral 8 is a known pump displacement control device, which is configured as disclosed in detail in JP-B-6-58111. As briefly explained on the pump control device 8 shown in FIG. 11, the upstream pressure of a throttle 30 disposed in a center bypass circuit of the control valve 9 is directed to the pump control device 8 of the variable displacement hydraulic pump 6 through the pilot oil path 28.

As the control valve 9 is operated from the (II) position (neutral position) to the (I) position or the (III) position, the flow volume in the center bypass circuit of the control valve 9 gradually decreases, and therefore the upstream-side pressure of the throttle 30 also gradually decreases. The pump displacement of the variable displacement hydraulic pump 6 gradually increases in inverse proportion to the upstream-side pressure of the throttle 30. When the control valve 9 is completely switched to the (I) position or the (III) position, the center bypass circuit is blocked, and therefore the upstream-side pressure of the throttle 30 reaches the level of the pressure in the tank 22.

At this time, the variable displacement hydraulic pump 6 exhibits its maximum pump displacement. The engine speed can thus be controlled by detecting that the pressure in the pilot oil path 28 becomes equal to the pressure in the tank 22.

Alternatively, the engine speed can be controlled by obtaining the pump displacement of the variable displacement hydraulic pump 6 according to the measured value of the engine speed and the engine torque or by directly obtaining the pump displacement using the pump swash-plate angle sensor Accordingly, it is not to be understood that the hydraulic circuit according to the invention is limited to the load sensing hydraulic circuit.

When the load of the hydraulic actuator 10 starts decreasing after increasing, the controller 7 reduces the load while the load and the engine torque are matched on the maximum torque line R. When the relationship between the change in the target engine speed N and the detected pump displacement D is obtained from FIG. 7, the engine torque T is reduced from the matching point of the maximum torque line R and the high-speed control area Fn, for instance, in the high-speed control area Fn.

After the target engine speed N is shifted from the second target engine speed N2 to the first target engine speed N1 (i.e. when the high-speed control area is shifted to the high-speed control area F1), the engine torque T is decreased to the maximum rated horsepower point K1.

When the control lever 11*a* returns to the previous position after being deeply moved, the swash-plate angle of the hydraulic pump 6 becomes smaller, and therefore the controller 7 controls the fuel injection device 3 to reduce the fuel injection quantity. In this manner, the pump displacement of the hydraulic pump 6 is reduced from the maximum pump displacement in the high-speed control area Fn or the high-speed control area F1 while the engine load and the engine torque are matched.

When the pump displacement D of the hydraulic pump 6 tends to further decrease and the pump displacement of the hydraulic pump 6 falls below the first predetermined pump displacement D1 in the process of reducing the engine torque T while the engine load and the engine torque are matched, the drive of the engine is controlled so that the engine is driven at the target engine speed N, which is obtained from FIG. 7, corresponding to the detected pump displacement D.

The position on the high-speed control area F1 at this time can be set as a first set position A (i.e. the first predetermined pump displacement D1). The first predetermined pump displacement D1 may be set at the maximum pump displacement of the hydraulic pump 6 or set at a value equal to or below the maximum pump displacement.

The first set position A may be set as follows in place of being set at a position at the time when the pump displacement of the hydraulic pump 6 tends to decrease, and therefore the pump displacement of the hydraulic pump 6 falls from the first predetermined pump displacement D1. Specifically, the first set position A may be set at a position on the high-speed control area F1 at the time when the differential pressure between the discharge pressure of the hydraulic pump 6 and the load pressure of the hydraulic actuator 10 exceeds the load sensing differential pressure set by the pump control device 8.

In this manner, the engine load and the engine torque can be matched. The engine 2 can thus be driven on the low-speed side, which results in an improvement in the fuel consumption of the engine 2.

Incidentally, FIG. 4 shows the shift from the high-speed control area F1 to the high-speed control area Fn. The value of the pump displacement used to determine the first set position A and that of the pump displacement used to determined the second set position B may be set equal or different.

Further, the first set position A may be changed according to the change rate of the engine torque T, the change rate of the pump displacement of the hydraulic pump 6 or the change rate of the discharge pressure P of the hydraulic pump 6. Specifically, if these change rates (i.e. decrease rates) are relatively high, the first set position A can be set at the high engine torque side so that the shift to the high-speed control area F2 is done at an early stage.

According to the invention, in order to improve the fuel efficiency of an engine, when an operator sets the first target engine speed N1 and the associated high-speed control area F1 based on the command value of the fuel dial 4 and sets the second target engine speed N2 and the high-speed control area F2 of the low-speed side determined in advance corresponding respectively to the first target engine speed N1 and the high-speed control area F1, the engine can be controlled to be driven based on the second target engine speed N2 or the high-speed control area F2.

Accordingly, the engine is controlled to be driven in an area where a high engine torque is unnecessary based on the second target engine speed N2 on the low-speed side, whereby the fuel efficiency of the engine is improved. On the other hand, in an area where a high engine torque is required, the drive of the engine is controlled so that the engine is driven at the target engine speed N determined in advance corresponding to the detected pump displacement D, whereby a sufficient operation speed required to operate a work equipment is obtained.

Further, in order to reduce the engine torque from when the output of the engine is high, the drive of the engine is controlled so that the engine is driven at the target engine speed N that determined in advance corresponding to the detected pump displacement D, which results in an improvement in fuel consumption.

It is described above, with reference to FIG. 11, that the invention is favorably applied to the open-center hydraulic circuit. It is known that the open-center hydraulic circuit includes a negative-control hydraulic circuit and a positive-control hydraulic circuit. A further detailed description will be made on respective examples related to the negative-control hydraulic circuit and the positive-control hydraulic circuit.

Figure 12:
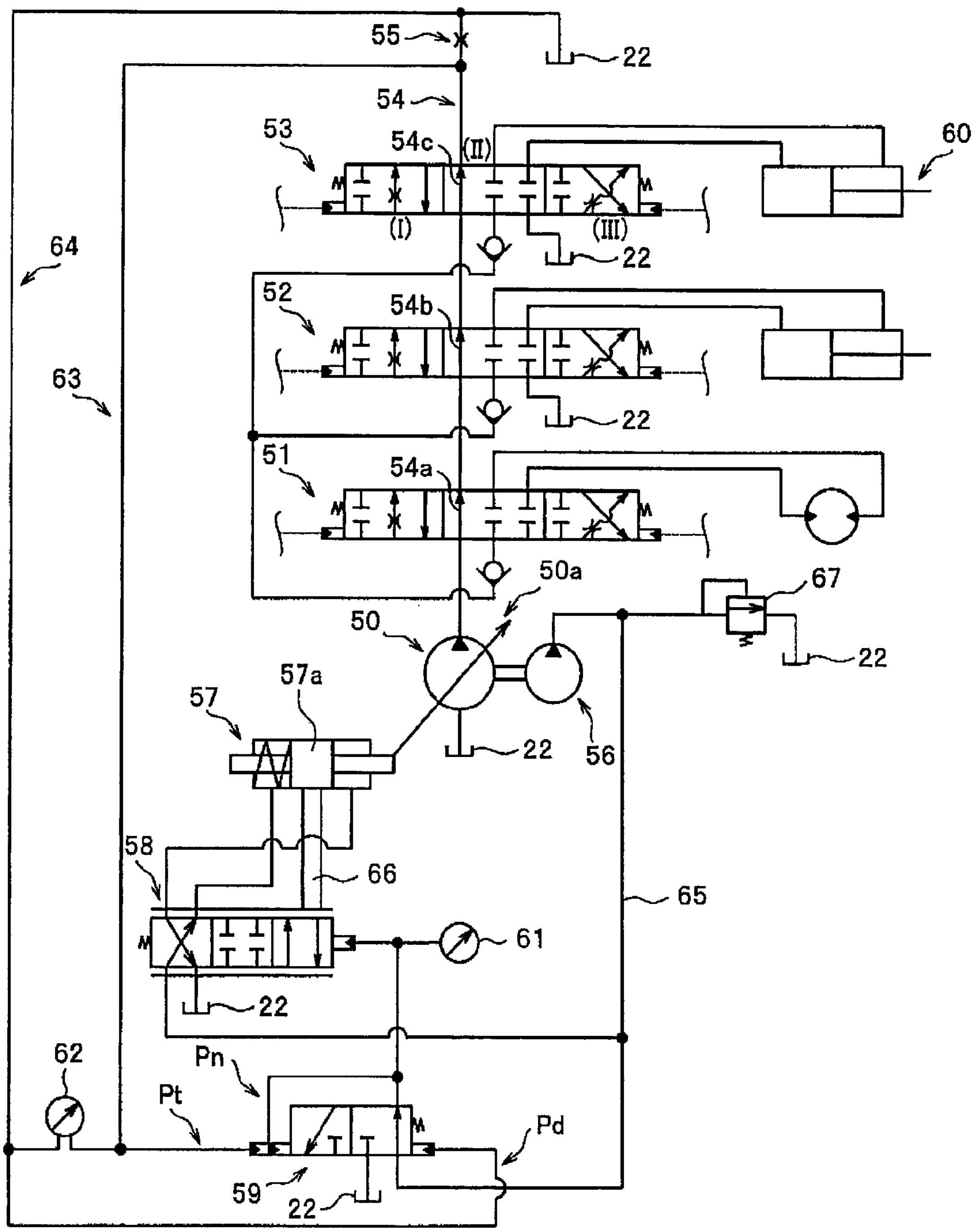
FIG. 12 is an open-center negative-control hydraulic circuit diagram. (Example)

The example related to the negative-control hydraulic circuit will be described with reference to FIG. 12. The control characteristics of a negative-control valve 59 in the negative-control hydraulic circuit shown in FIG. 12 are illustrated with reference to FIG. 13. The pump control characteristics in the negative-control hydraulic circuit also shown in FIG. 12 are illustrated with reference to FIG. 14.

As shown in FIG. 12, in the negative-control hydraulic circuit, an engine (not shown) rotates a variable displacement hydraulic pump 50 and the discharge flow from the variable displacement hydraulic pump 50 is supplied to a first control valve 51, a second control valve 52 and a third control valve 53. The third control valve 53 is configured as a control valve to control a hydraulic actuator 60. Each of the first control valve 51 and the second control valve 52 is also configured as a control valve to control a hydraulic actuator (no reference numeral is assigned thereto).

Figure 15:
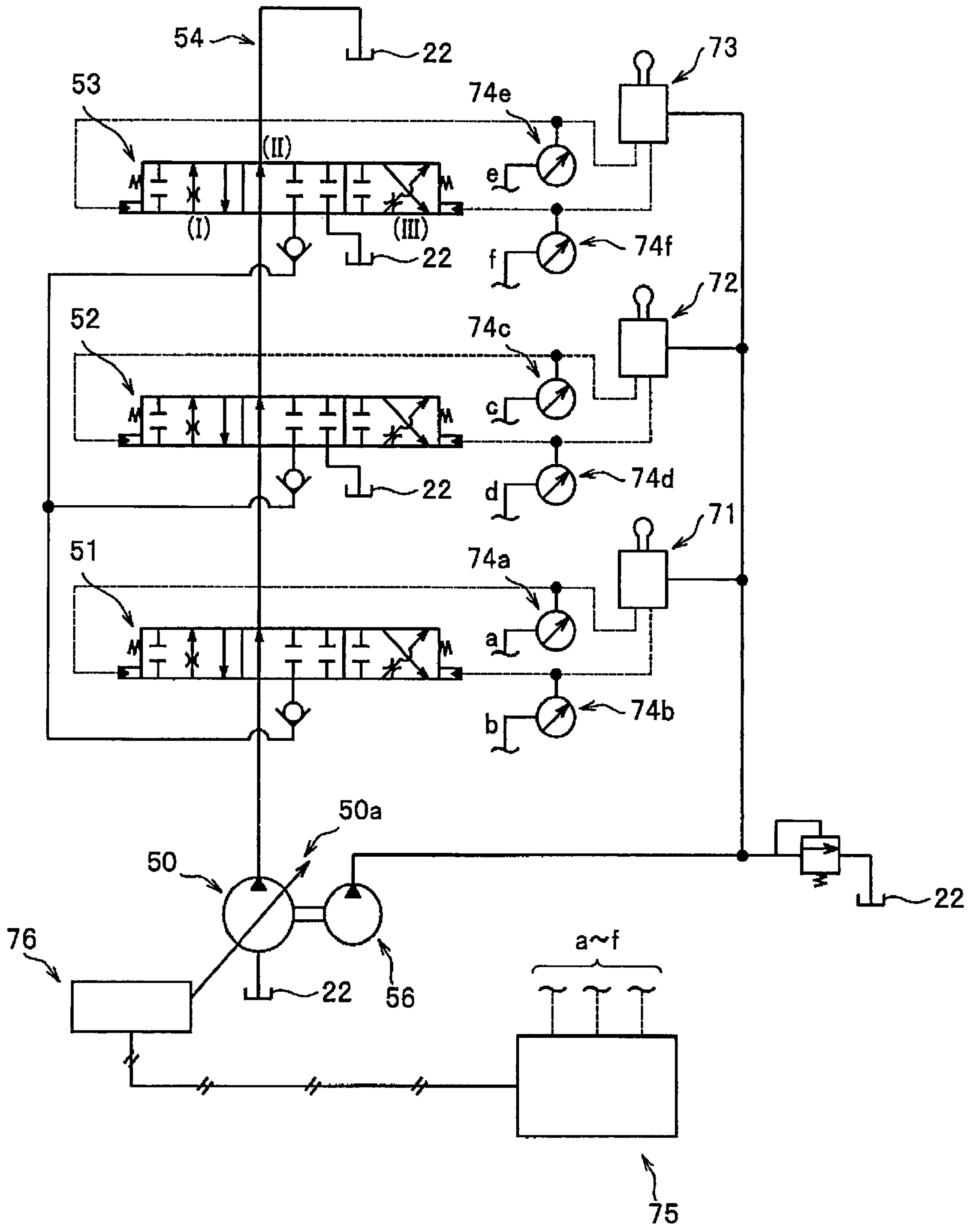
FIG. 15 is an open-center positive-control hydraulic circuit diagram. (Example)

Pilot valves for controlling respective first to third control valves 51 to 53 may be configured as shown in FIG. 15, which is provided to illustrate a below-described positive-control hydraulic circuit. These pilot valves are omitted in FIG. 12.

A center bypass circuit 54 of the first control valve 51 is connected to a center bypass circuit 54*b* of the second control valve 52. The center bypass circuit 54*b* of the second control valve 52 is connected to a center bypass circuit 54*c* of the third control valve 53. The center bypass circuit 54*c* of the third control valve 53 is connected to a center bypass circuit 54 communicating with the tank 22. A throttle 55 is disposed in the center bypass circuit 54.

An upstream-side pressure Pt of the throttle 55 is taken through an oil path 63. The downstream-side pressure Pd of the throttle 55 is taken through an oil path 64. The upstream/downstream differential pressure (Pt−Pd) of the throttle 55 (i.e. the pressure difference between the oil path 63 and the oil path 64) is detected by a pressure sensor 62.

The engine (not shown) is driven, whereby a pilot hydraulic pump 56 is driven for rotation. The discharge flow from the pilot hydraulic pump 56 is supplied to the negative-control valve 59 and a servo guide valve 58. The discharge pressure from the pilot hydraulic pump 56 is adjusted by a relief valve 67 so as not to exceed a predetermined pressure.

The swash-plate angle of a swash plate 50*a* for controlling the pump displacement of the variable displacement hydraulic pump 50 is controlled by a servo hydraulic actuator 57, the servo guide valve 58 and the negative-control valve 59. The negative-control valve 59 is configured as a switching valve assigned with a 3 port 2 position. A spring force and the downstream-side pressure Pd of the throttle 55, which is disposed in the center bypass circuit 54, act on one end of the negative-control valve 59 via the oil path 64.

The upstream-side pressure Pt of the throttle 55 acts on the other end of the negative-control valve 59 via the oil path 63. Likewise, an output pressure Pn from the negative-control valve 59 acts on the other end of the negative-control valve 59. Using the discharge pressure supplied from the pilot hydraulic pump 56 through an oil path 65 as a source pressure, the negative-control valve 59 controls the output pressure Pn. The output pressure Pn is detected by a pressure sensor 61.

The negative-control valve 59 is usually switched to a switched position for discharging the discharge flow supplied from pilot hydraulic pump 56 through the oil path 65 by the spring force. When the upstream/downstream differential pressure (Pt−Pd) of the throttle 55 increases, the negative-control valve 59 is switched to another switching position for decreasing the discharge flow therefrom.

In other words, the negative-control valve 59 performs a control according to the upstream/downstream differential pressure (Pt−Pd) of the throttle 55. In response to the increase in the upstream/downstream differential pressure (Pt−Pd), a control is performed for decreasing the discharge flow from the negative-control valve 59. In response to the decrease in the upstream/downstream differential pressure (Pt−Pd), a control is performed for increasing the discharge flow from the negative-control valve 59.

The servo guide valve 58 is configured as a switching valve that allows switching to a 4 port 3 position. The output pressure Pn from the negative-control valve 59 acts on one end of a servo spool and the spring force acts on the other end of the servo spool. The discharge flow from the pilot hydraulic pump 56 is supplied to the servo guide valve 58 via a servo operating portion. The servo operating portion of the servo guide valve 58 is connected via an interlocking member 66 to a servo piston 57*a* of the servo hydraulic actuator 57, for turning the swash plate 50*a* of the variable displacement hydraulic pump 50.

The port of the servo guide valve 58 and the hydraulic chamber of the servo hydraulic actuator 57 are connected via the servo operating portion of the servo guide valve 58. The servo piston 57*a* of the servo hydraulic actuator 57 biases the swash plate 50*a* in a minimum swash plate direction with the assistance of the biasing force of the spring.

Next, description will be made on an operation for controlling the pump displacement of the variable displacement hydraulic pump 50. When, for instance, the third control valve 53 is operated from the (II) position (neutral position) to the (I) position or the (III) position by the pilot valve (not shown), the center bypass circuit 54*c* of the third control valve 53 is gradually closed. Simultaneously, a circuit connected to the hydraulic actuator 60 is gradually opened, and therefore the hydraulic actuator 60 becomes operable. As the center bypass circuit 54*c* is gradually closed, the flow rate in the center bypass circuit 54 and the upstream/downstream differential pressure (Pt−Pd) of the throttle 55 fall.

Figure 13:
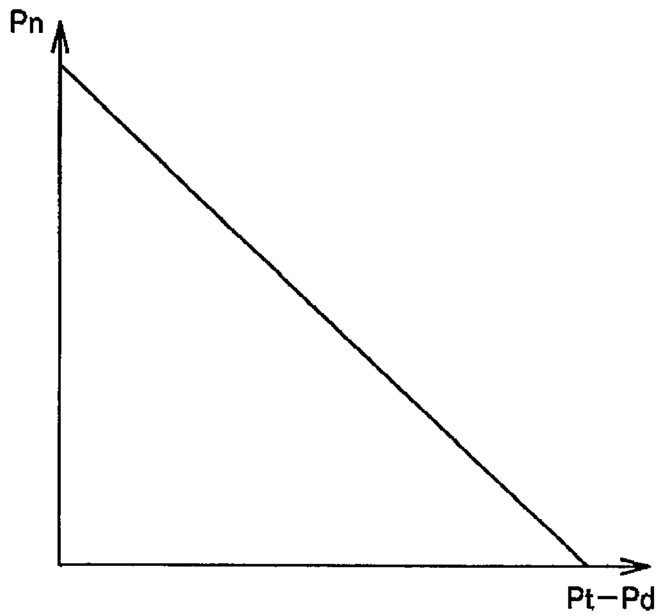
FIG. 13 is a graph showing the control characteristics of the negative-control hydraulic circuit of FIG. 12. (Example)

Upon a decrease in the upstream/downstream differential pressure (Pt−Pd) of the throttle 55, the negative-control valve 59, to which the upstream/downstream differential pressure (Pt−Pd) of the throttle 55 acts, is switched to the switched position on the right side in FIG. 12 by the biasing force of the spring. Specifically, as shown in FIG. 13, a decrease in the upstream/downstream differential pressure (Pt−Pd) of the throttle 55 leads to an increase in the output pressure Pn from the negative-control valve 59.

Incidentally, the horizontal axis represents the upstream/downstream differential pressure (Pt−Pd) and the vertical axis represents the output pressure Pn from the negative-control valve 59.

Upon an increase in the output pressure Pn, the spool of the servo guide valve 58 slides in the left direction in FIG. 12, whereby the servo guide valve 58 is switched to the switched position on the right side in FIG. 12. The discharge flow from the pilot hydraulic pump 56 supplied to the servo guide valve 58 is introduced into the hydraulic chamber on the right side of the servo hydraulic actuator 57 from the servo guide valve 58.

The servo piston 57*a* of the servo hydraulic actuator 57 thus slides in the left direction in FIG. 12 against the spring force, whereby the swash plate 50*a* is turned to increase the pump displacement of the variable displacement hydraulic pump 50. The swash-plate angle in the variable displacement hydraulic pump 50 is then controlled so that a sufficient flow for activating the hydraulic actuator 60 is discharged from the variable displacement hydraulic pump 50.

When the servo piston 57*a* slides in the left direction in FIG. 12, the servo operating portion of the servo guide valve 58 is slid in the left direction in FIG. 12 via the interlocking member 66, which serves to return the servo guide valve 58 to the neutral position.

When the output pressure from the negative-control valve 59 becomes one corresponding to the upstream/downstream differential pressure (Pt−Pd) of the throttle 55, the servo guide valve 58 is kept at the neutral position in a balanced manner. At this time, the slide position of the servo piston 57*a* of the servo hydraulic actuator 57 is located at a position corresponding to the output pressure Pn. The pump displacement D of the variable displacement hydraulic pump 50 corresponds to the output pressure Pn (i.e. the pump displacement D corresponding to the upstream/downstream differential pressure (Pt−Pd) of the throttle 55).

Incidentally, the horizontal axis represents the output pressure Pn from the negative-control valve 59 and the vertical axis represents the pump displacement D of the variable displacement hydraulic pump 50.

In the above-description related to the open-center hydraulic circuit shown in FIG. 15, the pump displacement of the hydraulic pump may be obtained according to the measured value of the engine speed and the torque chart of the engine, or, alternatively, the pump displacement may be directly obtained by a swash-plate angle sensor attached to the hydraulic pump. It is also described above that the engine speed is controlled by detecting that the pressure in the pilot oil path 28 becomes a tank pressure. However, in the negative-control hydraulic circuit shown in FIG. 12, the pressure sensor 61 may further be provided for detecting the output pressure Pn from the negative-control valve 59 so as to obtain a command value D for instructing the pump displacement of the variable displacement hydraulic pump using a characteristic graph of FIG. 14.

Figure 14:
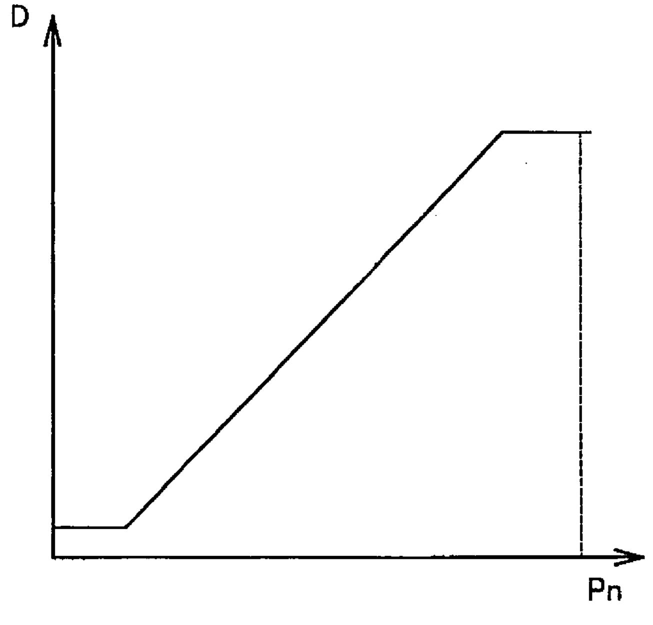
FIG. 14 is a graph showing the pump control characteristics of the negative-control hydraulic circuit of FIG. 12. (Example)

Likewise, the pressure sensor 62 may further be provided for detecting the upstream/downstream differential pressure (Pt−Pd) of the throttle 55 so as to obtain the command value D for instructing the pump displacement of the variable displacement hydraulic pump 50 using the characteristic graphs of FIG. 13 and FIG. 14.

In this manner, in the negative-control hydraulic circuit, since the command value D for instructing the pump displacement of the variable displacement hydraulic pump 50 is obtained, the engine speed can be controlled. The obtained value is input into the controller 7 shown in FIG. 1 so that the controller 7 can control the engine speed.

Incidentally, in FIG. 12, when the engine speed of an engine (not shown) that drives the variable displacement hydraulic pump 50 is set on a low-speed side, the center bypass flow passing through the throttle 55 of the center bypass circuit 54 falls. Thus, the upstream/downstream differential pressure (Pt−Pd) of the throttle 55 becomes smaller and the output pressure Pn from the negative-control valve 59 increases as shown in FIG. 13. This results in an increase in the pump displacement D of the variable displacement hydraulic pump 50 according to the characteristic graph of FIG. 14.

In this manner, even when the engine speed is set on the low-speed side, the pump displacement D can be controlled in the same manner as when the engine speed is not set on the low-speed side. This means that the pump displacement D can likewise be controlled irrespective of whether or not the engine speed is set on the low-speed side in the same manner as in the load sensing hydraulic circuit.

Figure 16:
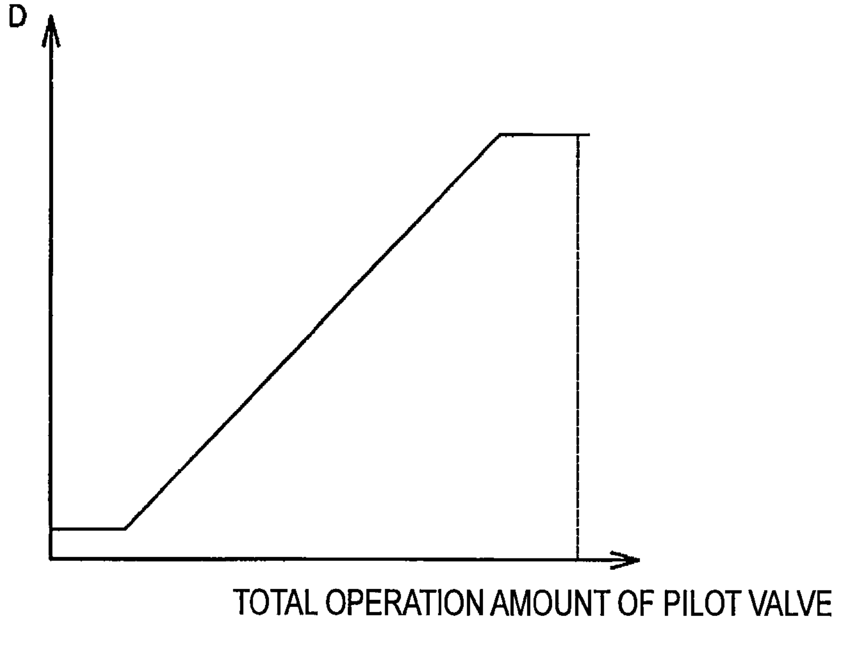
FIG. 16 is a graph showing the pump control characteristics of the positive-control hydraulic circuit of FIG. 15. (Example)

Next, the example related to the positive-control hydraulic circuit is made with reference to FIG. 15. The pump control characteristics of the positive-control hydraulic circuit shown in FIG. 15 will be described with reference to FIG. 16. In the positive-control hydraulic circuit, like reference numerals are attached to the structure or components equivalent to those in the negative-control hydraulic circuit shown in FIG. 12 and description thereon is omitted.

As shown in FIG. 15, the positive-control hydraulic circuit includes a first pilot valve 71, a second pilot valve 72 and a third pilot valve 73 for respectively operating the first control valve 51, the second control valve 52 and the third control valve 53. The first to third pilot valves 71 to 73 are individually operated, so that the discharge pressure oil from the pilot hydraulic pump 56 can be applied to the spool of the individual first to third control valves 51 to 53 via a pipe represented by a broken line.

According to the operation amount and the operated direction of the individual first to third pilot valves 71 to 73, the corresponding first to third control valves 51 to 53 are respectively controlled.

The operation amount of the individual first to third pilot valves 71 to 73 are detected by pressure sensors 74*a* to 74*f* disposed in pipes, represented by broken lines, connecting t the first to third pilot valves 71 to 73 and the first to third control valves 51 to 53.

The detected pressure detected by the individual pressure sensors 74*a* to 74*f* is input into a controller 75 via harnesses represented by a to f. When a plurality of operations are performed on first to third control valves 51 to 53, the detected pressure supplied from the individual pressure sensors 74*a* to 74*f* is input into the controller 75. The controller 75 calculates the total of a plurality of the input detected pressures and the command value D of the pump displacement corresponding to the calculated total is determined according to the horizontal axis representing the total of the detected pressures.

The command value D of the pump displacement is output to a pump control device 76 and the pump control device 76 is controlled so that the pump displacement of the variable displacement hydraulic pump 50 reaches the command value D. When, for instance, the first pilot valve 71 and the second pilot valve 72 are operated, the discharge flow from the variable displacement hydraulic pump 50 is supplied to a hydraulic actuator (not shown) via the first control valve 51 and the second control valve 52.

In the above case, when the first pilot valve 71 and the second pilot valve 72 are not operated to the full stroke, the first control valve 51 and the second control valve 52, which are respectively controlled by the first pilot valve 71 and the second pilot valve 72, are also not switched to the full stroke positions. Thus, a residual oil is directed back to the tank 22 through the center bypass circuit 54.

In this manner, in such a positive-control hydraulic circuit, the first to third pilot valves 71 to 73 are individually operated, and therefore the hydraulic actuators, controlled by the first to third pilot valves 71 to 73, are individually controlled in speed Further, since the command value D of the pump displacement in the above-described positive-control hydraulic circuit is determined by the controller 75, the engine speed can be controlled by using the command value D.

Accordingly, it is to be understood that the hydraulic circuit according to the invention is not limited to the load sensing hydraulic circuit and is suitably applicable to any one of the open-center hydraulic circuit, more specifically, the open-center negative-control hydraulic circuit and the open-center positive-control hydraulic circuit.

The invention claimed is:

1. An engine control device comprising:

a variable displacement hydraulic pump driven by an engine;

a hydraulic actuator driven by a discharge pressure oil from the hydraulic pump;

a control valve that controls the discharge pressure oil from the hydraulic pump so that the discharge pressure oil is supplied to the hydraulic actuator;

a detector that detects a pump displacement of the hydraulic pump and an engine torque;

a fuel injection device that controls a fuel supplied to the engine;

a fuel dial that selects one of variable command values and commands a target engine speed to the engine;

a first setting unit that sets a first target engine speed according to the command value selected by the fuel dial and a second target engine speed based on the first target engine speed, the second target engine speed being lower than the first target engine speed by a predetermined speed; and a second setting unit that determines a target engine speed corresponding to the pump displacement detected by the detector and a target engine speed corresponding to the engine torque detected by the detector, and sets one of the determined target engine speeds as a target engine speed, wherein during drive control of the engine based on the second target engine speed, the second setting unit sets the target engine speed to be a higher one of (i) the target engine speed corresponding to the pump displacement detected by the detector, and (ii) the target engine speed corresponding to the engine torque detected by the detector, and the fuel injection device is controlled so that the engine is controllably driven at the target engine speed set by the second setting unit.

2. The engine control device according to claim 1, wherein while the engine is controlled based on the second target engine speed, the fuel is controlled by the fuel injection device based on the target engine speed set by the second setting unit after the pump displacement of the hydraulic pump exceeds a preset second predetermined pump displacement or after the engine torque exceeds a preset second predetermined engine torque.

3. The engine control device according to claim 1, wherein while the engine is controlled based on the first target engine speed, the second setting unit sets the target engine speed to be the higher one of (i) the target engine speed corresponding to the pump displacement detected by the detector, and (ii) the target engine speed corresponding to the engine torque detected by the detector and the fuel is controlled by the fuel injection device based on the target engine speed set by the second setting unit, after the pump displacement of the hydraulic pump falls below a preset first predetermined pump displacement or after the engine torque falls below a preset first predetermined engine torque.

4. An engine control method of an engine control device, the engine control device comprising: a variable displacement hydraulic pump driven by an engine; a hydraulic actuator driven by a discharge pressure oil from the hydraulic pump; a control valve that controls the discharge pressure oil from the hydraulic pump so that the discharge pressure oil is supplied to the hydraulic actuator; and a detector that detects a pump displacement of the hydraulic pump and an engine torque, wherein the engine control method comprises:

selecting one of variable command values so that a first target engine speed is set according to the selected variable command value;

setting a second target engine speed based on the first target engine speed, the second target engine speed being lower than the first target engine speed by a predetermined speed;

determining target engine speeds corresponding to the detected pump displacement and the detected engine torque; and during drive of the engine based on the second target engine speed, controlling the drive of the engine based on a higher one of (i) the determined target engine speed corresponding to the pump displacement detected by the detector, and (ii) the determined target engine speed corresponding to the engine torque detected by the detector.

5. The engine control method according to claim 4, wherein while the engine is controlled based on the second target engine speed, the drive of the engine is controlled based on the higher one of the determined target engine speeds after the pump displacement of the hydraulic pump exceeds a preset second predetermined pump displacement or after the engine torque exceeds a preset second predetermined engine torque.

6. The engine control method according to claim 4, wherein while the engine is controlled based on the first target speed, the drive of the engine is controlled based on the higher one of the determined target engine speeds after the pump displacement of the hydraulic pump falls below a preset first predetermined pump displacement or after the engine torque falls below a preset first predetermined engine torque.

* * * * *